US010042524B2

(12) United States Patent
Bogomolov et al.

(10) Patent No.: US 10,042,524 B2
(45) Date of Patent: Aug. 7, 2018

(54) OVERVIEW USER INTERFACE OF EMERGENCY CALL DATA OF A LAW ENFORCEMENT AGENCY

(71) Applicant: Palantir Technologies Inc., Palo Alto, CA (US)

(72) Inventors: Arseny Bogomolov, Arlington, VA (US); Justin Streufert, North Potomac, MD (US); Bryan Knight, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 774 days.

(21) Appl. No.: 14/581,823

(22) Filed: Dec. 23, 2014

(65) Prior Publication Data
US 2015/0178877 A1  Jun. 25, 2015

Related U.S. Application Data

(63) Continuation of application No. 14/108,187, filed on Dec. 16, 2013, now Pat. No. 8,924,872.
(Continued)

(51) Int. Cl.
*G06F 3/0484* (2013.01)
*G06F 17/30* (2006.01)
(Continued)

(52) U.S. Cl.
CPC .......... *G06F 3/0484* (2013.01); *G06F 3/0481* (2013.01); *G06F 3/0482* (2013.01);
(Continued)

(58) Field of Classification Search
CPC .......... G06F 17/30241; G06F 17/3087; G06F 3/0482; G06F 3/04886; G06F 17/30994;
(Continued)

(56) References Cited

U.S. PATENT DOCUMENTS 4,899,161 A  2/1990 Morin et al.
4,958,305 A  9/1990 Piazza
(Continued)

FOREIGN PATENT DOCUMENTS

DE  10 2014 103 482  9/2014
DE     102013222023  1/2015
(Continued)

OTHER PUBLICATIONS

"A Word About Banks and the Laundering of Drug Money," Aug. 18, 2012, http://www.golemxiv.co.uk/2012/08/a-word-about-banks-and-the-laundering-of-drug-money/.
(Continued)

*Primary Examiner* — Nicholas Ulrich
(74) *Attorney, Agent, or Firm* — Knobbe Martens Olson & Bear LLP

(57) ABSTRACT

Techniques in this disclosure may provide a user interface that concurrently displays multiple panels which provide visualization of emergency call data of a law enforcement agency. The user interface can provide a high-level overview of emergency calls in a geographical area. Each panel in the user interface can provide visualization of the emergency calls and/or statistics relating to the calls. A user can customize which panels to include in the user interface and/or customize setting for each panel. The user may apply various types of filters to the data displayed in the user interface, and the panels can update the visualizations according to the filters. The user interface can also provide the ability to show data at various levels of detail within the same user interface or panel. The techniques in the disclosure can provide a convenient, digestible overview of tactical and/or strategic data in a single user interface.

19 Claims, 21 Drawing Sheets

Related U.S. Application Data

(60) Provisional application No. 61/893,058, filed on Oct. 18, 2013.

(51) Int. Cl.

| | |
|---|---|
| *G09B 29/00* | (2006.01) |
| *G06Q 50/26* | (2012.01) |
| *G06F 3/0482* | (2013.01) |
| *G06F 3/0481* | (2013.01) |
| *H04W 4/90* | (2018.01) |
| *G06Q 10/06* | (2012.01) |
| *H04W 4/02* | (2018.01) |
| *H04W 4/22* | (2009.01) |
| *H04M 3/51* | (2006.01) |

(52) U.S. Cl.
CPC .... *G06F 3/04817* (2013.01); *G06F 17/30241* (2013.01); *G06Q 10/06* (2013.01); *G06Q 50/26* (2013.01); *G06Q 50/265* (2013.01); *G09B 29/006* (2013.01); *H04W 4/02* (2013.01); *H04W 4/22* (2013.01); *H04W 4/90* (2018.02); *H04M 3/5133* (2013.01); *H04M 2201/42* (2013.01); *H04M 2242/04* (2013.01)

(58) Field of Classification Search
CPC ....... G06F 2203/04803; H04M 3/5116; G09B 29/006; G09B 29/003; G06Q 50/265; G06Q 50/26
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,632,987 A | 5/1997 | Rao et al. | |
| 5,670,987 A | 9/1997 | Doi et al. | |
| 5,754,182 A | 5/1998 | Kobayashi | |
| 5,781,195 A | 7/1998 | Marvin | |
| 5,781,704 A | 7/1998 | Rossmo | |
| 5,798,769 A | 8/1998 | Chiu et al. | |
| 5,845,300 A | 12/1998 | Comer | |
| 6,057,757 A | 5/2000 | Arrowsmith et al. | |
| 6,091,956 A | 7/2000 | Hollenberg | |
| 6,157,747 A | 12/2000 | Szeliski et al. | |
| 6,161,098 A | 12/2000 | Wallman | |
| 6,173,067 B1 | 1/2001 | Payton et al. | |
| 6,178,432 B1 | 1/2001 | Cook et al. | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,389,289 B1 | 5/2002 | Voce et al. | |
| 6,414,683 B1 | 7/2002 | Gueziec | |
| 6,456,997 B1 | 9/2002 | Shukla | |
| 6,483,509 B1 | 11/2002 | Rabenhorst | |
| 6,529,900 B1 | 3/2003 | Patterson et al. | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,662,103 B1 | 12/2003 | Skolnick et al. | |
| 6,714,936 B1 | 3/2004 | Nevin, III | |
| 6,757,445 B1 | 6/2004 | Knopp | |
| 6,775,675 B1 | 8/2004 | Nwabueze et al. | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,976,210 B1 | 12/2005 | Silva et al. | |
| 6,980,984 B1 | 12/2005 | Huffman et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witowski et al. | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,375,732 B2 | 5/2008 | Arcas | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,457,706 B2 | 11/2008 | Malero et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,519,470 B2 | 4/2009 | Brasche et al. | |
| 7,525,422 B2 | 4/2009 | Bishop et al. | |
| 7,529,195 B2 | 5/2009 | Gorman | |
| 7,529,727 B2 | 5/2009 | Arning et al. | |
| 7,529,734 B2 | 5/2009 | Dirisala | |
| 7,539,666 B2 | 5/2009 | Ashworth et al. | |
| 7,546,245 B2 | 6/2009 | Surpin et al. | |
| 7,558,677 B2 | 6/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,640,173 B2 | 12/2009 | Surpin et al. | |
| 7,663,621 B1 | 2/2010 | Allen et al. | |
| 7,716,067 B2 | 3/2010 | Surpin et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,770,100 B2 | 8/2010 | Chamberlain et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,818,658 B2 | 10/2010 | Chen | |
| 7,870,493 B2 | 1/2011 | Pall et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,945,852 B1 | 5/2011 | Pilskains | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 6/2011 | Caro et al. | |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,010,886 B2 | 8/2011 | Gusmorino et al. | |
| 8,015,487 B2 | 9/2011 | Roy et al. | |
| 8,019,709 B2 | 9/2011 | Norton et al. | |

(56) References Cited

U.S. PATENT DOCUMENTS

| | | |
|---|---|---|
| 8,024,778 B2 | 9/2011 | Cash et al. |
| 8,036,632 B1 | 10/2011 | Cona et al. |
| 8,065,080 B2 | 11/2011 | Koch |
| 8,082,172 B2 | 12/2011 | Chao et al. |
| 8,085,268 B2 | 12/2011 | Carrino et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,411,046 B2 | 4/2013 | Kruzensiki et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,840 B1 | 10/2013 | Milgramm |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,597 B2 | 3/2014 | Buehler et al. |
| 8,676,857 B1 | 3/2014 | Adams et al. |
| 8,689,108 B1 | 4/2014 | Duffield et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,756,224 B2 | 6/2014 | Dassa et al. |
| 8,768,009 B1 | 7/2014 | Smith |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,799,812 B2 | 8/2014 | Parker |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 2001/0021936 A1 | 9/2001 | Bertram |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130867 A1 | 9/2002 | Yang et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0052896 A1 | 3/2003 | Higgins et al. |
| 2003/0103049 A1 | 6/2003 | Kindratenko et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0039498 A1 | 2/2004 | Ollis et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0194549 A1 | 10/2004 | Noel |
| 2004/0210847 A1 | 10/2004 | Berson et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182502 A1 | 8/2005 | Iyengar |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0146050 A1 | 7/2006 | Yamauchi |

(56) References Cited

U.S. PATENT DOCUMENTS

| | | |
|---|---|---|
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0251307 A1 | 11/2006 | Florin et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0188516 A1 | 8/2007 | Loup et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208681 A1 | 9/2007 | Bucholz |
| 2007/0208736 A1 | 9/2007 | Tanigawa et al. |
| 2007/0240062 A1 | 10/2007 | Christena et al. |
| 2007/0258642 A1 | 11/2007 | Thota |
| 2007/0266336 A1 | 11/2007 | Nojima et al. |
| 2007/0294643 A1 | 12/2007 | Kyle |
| 2008/0010605 A1 | 1/2008 | Frank |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Worley et al. |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0223834 A1 | 9/2008 | Griffiths et al. |
| 2008/0228512 A1 | 9/2008 | Calkins et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076968 A1 | 3/2010 | Boyns et al. |
| 2010/0100963 A1 | 4/2010 | Mahaffey |
| 2010/0103124 A1 | 4/2010 | Kruzensiki et al. |
| 2010/0106420 A1 | 4/2010 | Mattikalli et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0022312 A1 | 1/2011 | McDonough et al. |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1* | 12/2011 | Whisenant ............ G08B 25/14 340/686.1 |
| 2011/0310005 A1 | 12/2011 | Chen et al. |
| 2011/0314007 A1 | 12/2011 | Dassa et al. |
| 2012/0019559 A1 | 1/2012 | Siler et al. |

(56) References Cited

U.S. PATENT DOCUMENTS

| | | |
|---|---|---|
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0105632 A1 | 5/2012 | Renkis |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0196557 A1 | 8/2012 | Reich et al. |
| 2012/0196558 A1 * | 8/2012 | Reich .................. G06Q 10/10 455/404.1 |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0021445 A1 | 1/2013 | Cossette-Pacheco et al. |
| 2013/0024202 A1 | 1/2013 | Harris et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 * | 3/2013 | Pearcy .................. G06F 21/552 715/788 |
| 2013/0073377 A1 | 3/2013 | Heath |
| 2013/0073454 A1 | 3/2013 | Busch |
| 2013/0076732 A1 | 3/2013 | Cervelli et al. |
| 2013/0078943 A1 | 3/2013 | Biage et al. |
| 2013/0097482 A1 | 4/2013 | Marantz et al. |
| 2013/0100134 A1 | 4/2013 | Cervelli et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0188847 A1 | 7/2014 | Tang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma et al. |
| 2014/0267295 A1 | 9/2014 | Sharma et al. |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0361899 A1 | 12/2014 | Layson |
| 2015/0019394 A1 | 1/2015 | Unser et al. |
| 2015/0029176 A1 | 1/2015 | Baxter et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |

FOREIGN PATENT DOCUMENTS

| | | |
|---|---|---|
| DE | 102014215621 | 2/2015 |
| EP | 0763201 | 3/1997 |
| EP | 1 672 527 | 6/2006 |
| EP | 2 551 799 | 1/2013 |
| EP | 2560134 | 2/2013 |
| EP | 2575107 | 4/2013 |
| EP | 2 778 977 | 9/2014 |
| EP | 2 778 983 | 9/2014 |
| EP | 2 779 082 | 9/2014 |
| EP | 2778913 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| GB | 2 516 155 | 1/2015 |
| GB | 2518745 | 4/2015 |
| NL | 2012778 | 11/2014 |

(56) References Cited

FOREIGN PATENT DOCUMENTS

| | | |
|---|---|---|
| NL | 2013306 | 2/2015 |
| NZ | 624557 | 12/2014 |
| WO | WO 95/032424 | 11/1995 |
| WO | WO 00/009529 | 2/2000 |
| WO | WO 2002/065353 | 8/2002 |
| WO | WO 2004/057268 | 7/2004 |
| WO | WO 2005/013200 | 2/2005 |
| WO | WO 2005/104736 | 11/2005 |
| WO | WO 2008/064207 | 5/2008 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2011/058507 | 5/2011 |
| WO | WO 2013/010157 | 1/2013 |
| WO | WO 2013/0102892 | 7/2013 |

OTHER PUBLICATIONS

AMNET, "5 Great Tools for Visualizing Your Twitter Followers," posted Aug. 4, 2010, http://www.amnetblog.com/component/content/article/115-5-grate-tools-for-visualizing-your-twitter-followers.html.

Boyce, Jim, "Microsoft Outlook 2010 Inside Out," Aug. 1, 2010, retrieved from the internet https://capdtron.files.wordpress.com/2013/01/outlook-2010-inside_out.pdf.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Definition "Identify" downloaded Jan. 22, 2015, 1 page.

Definition "Overlay" downloaded Jan. 22, 2015, 1 page.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Li et al., "Interactive Multimodal Visual Search on Mobile Device," IEEE Transactions on Multimedia, vol. 15, No. 3, Apr. 1, 2013, pp. 594-607.

Nierman, "Evaluating Structural Similarity in XML Documents," 2002, 6 pages.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http:techcrunch.com//2013/05/15/deep-dive-with-the-new-google-maps-for-desktop-with-google-earth-integration-its-more-than-just-a-utility/.

"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Thompson, Mick, "Getting Started with GEO," Getting Started with GEO, Jul. 26, 2011.

Umagandhi et al., "Search Query Recommendations Using Hybrid User Profile with Query Logs," International Journal of Computer Applications, vol. 80, No. 10, Oct. 1, 2013, pp. 7-18.

Wikipedia, "Federated Database System," Sep. 7, 2013, retrieved from the internet on Jan. 27, 2015 http/en.wikipedia.org/w/index.php?title=Federated_database_system&oldid=571954221.

Yang et al., "HTML Page Analysis Based on Visual Cues," 2001, pp. 859-864.

Official Communication for Australian Patent Application No. 2014201511 dated Feb. 27, 2015.

Official Communication for Australian Patent Application No. 2014202442 dated Mar. 19, 2015.

Official Communication for Australian Patent Application No. 2014210604 dated Jun. 5, 2015.

Official Communication for Australian Patent Application No. 2014210614 dated Jun. 5, 2015.

Official Communication for Australian Patent Application No. 2014213553 dated May 7, 2015.

Official Communication for Australian Patent Application No. 2014250678 dated Jun. 17, 2015.

Official Communication for European Patent Application No. 14180142.3 dated Feb. 6, 2015.

Official Communication for European Patent Application No. 14180281.9 dated Jan. 26, 2015.

Official Communication for European Patent Application No. 14180321.3 dated Apr. 17, 2015.

Official Communication for European Patent Application No. 14180432.8 dated Jun. 23, 2015.

Official Communication for European Patent Application No. 14186225.0 dated Feb. 13, 2015.

Official Communication for European Patent Application No. 14187739.9 dated Jul. 6, 2015.

Official Communication for European Patent Application No. 14187996.5 dated Feb. 12, 2015.

Official Communication for European Patent Application No. 14189344.6 dated Feb. 20, 2015.

Official Communication for European Patent Application No. 14189802.3 dated May 11, 2015.

Official Communication for European Patent Application No. 14191540.5 dated May 27, 2015.

Official Communication for European Patent Application No. 14197879.1 dated Apr. 28, 2015.

Official Communication for European Patent Application No. 14197895.7 dated Apr. 28, 2015.

Official Communication for European Patent Application No. 14199182.8 dated Mar. 13, 2015.

Official Communication for Great Britain Patent Application No. 1404574.4 dated Dec. 18, 2014.

Official Communication for Great Britain Patent Application No. 1408025.3 dated Nov. 6, 2014.

Official Communication for Great Britain Patent Application No. 1411984.6 dated Dec. 22, 2014.

Official Communication for Great Britain Patent Application No. 1413935.6 dated Jan. 27, 2015.

Official Communication for Netherlands Patent Application No. 2013306 dated Apr. 24, 2015.

Official Communication for New Zealand Patent Application No. 622517 dated Apr. 3, 2014.

Official Communication for U.S. Appl. No. 12/556,318 dated Jul. 2, 2015.

Official Communication for U.S. Appl. No. 13/247,987 dated Apr. 2, 2015.

Official Communication for U.S. Appl. No. 13/831,791 dated Mar. 4, 2015.

Official Communication for U.S. Appl. No. 13/835,688 dated Jun. 17, 2015.

Official Communication for U.S. Appl. No. 13/839,026 dated Aug. 4, 2015.

Notice of Allowance for U.S. Appl. No. 14/102,394 dated Aug. 25, 2014.

Notice of Allowance for U.S. Appl. No. 14/108,187 dated Aug. 29, 2014.

Notice of Allowance for U.S. Appl. No. 14/135,289 dated Oct. 14, 2014.

Official Communication for U.S. Appl. No. 14/148,568 dated Oct. 22, 2014.

(56) References Cited

OTHER PUBLICATIONS

Official Communication for U.S. Appl. No. 14/148,568 dated Mar. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Notice of Allowance for U.S. Appl. No. 14/294,098 dated Dec. 29, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Notice of Allowance for U.S. Appl. No. 14/473,552 dated Jul. 24, 2015.
Notice of Allowance for U.S. Appl. No. 14/473,860 dated Jan. 5, 2015.
Official Communication for U.S. Appl. No. 14/486,991 dated Mar. 10, 2015.
Notice of Allowance for U.S. Appl. No. 14/486,991 dated May 1, 2015.
Official Communication for U.S. Appl. No. 14/504,103 dated Mar. 31, 2015.
Official Communication for U.S. Appl. No. 14/504,103 dated Feb. 5, 2015.
Notice of Allowance for U.S. Appl. No. 14/504,103 dated May 18, 2015.
Official Communication for U.S. Appl. No. 14/579,752 dated Aug. 19, 2015.
Official Communication for U.S. Appl. No. 14/579,752 dated May 26, 2015.
Notice of Allowance for U.S. Appl. No. 14/616,080 dated Apr. 2, 2015.
Official Communication for U.S. Appl. No. 14/639,606 dated May 18, 2015.
Official Communication for U.S. Appl. No. 14/639,606 dated Jul. 24, 2015.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," Sharing and Collaborating on Documents, May 1, 2008, pp. 93-97, 106-113 & 120-121.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine http://www.directionsmag.com/articles/retail-trade-area-analysis-using-the-huff-model/123411, Jul. 2, 2005 in 10 pages.

(56) References Cited

OTHER PUBLICATIONS

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Elsevier Science, Sep. 2010, Ch. 4 & 10, pp. 53-67 & 143-164.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: An Open RDF Infrastructure for Shared WEB Annotations", Computer Networks, 2002, vol. 39, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Palmas, et al., "An Edge-Bundling Layout for Interactive Parallel Coordinates," Proceedings of the 2014 IEEE Pacific Visualization Symposium, Mar. 2014, pp. 57-64.
Rouse, Margaret, "OLAP Cube," http://searchdatamanagement.techtarget.com/definition/OLAP-cube, Apr. 28, 2012, pp. 16.

Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Official Communication in European Search Report in Application No. 14189347.9 dated Mar. 4, 2015.
Official Communication in New Zealand Application No. 622513 dated Apr. 3, 2014.
Official Communication in European Application No. EP 14158861.6 dated Jun. 16, 2014.
Official Communication in New Zealand Application No. 622517 dated Apr. 3, 2014.
Official Communication in British Application No. GB1408025.3 dated Nov. 6, 2014.
Official Communication in New Zealand Application No. 624557 dated May 14, 2014.
Official Communication in New Zealand Application No. 628585 dated Aug. 26, 2014.
Official Communication in New Zealand Application No. 628495 dated Aug. 19, 2014.
Official Communication in New Zealand Application No. 628263 dated Aug. 12, 2014.
Official Communication in New Zealand Application No. 628161 dated Aug. 25, 2014.
Official Communication in New Zealand Application No. 627962 dated Aug. 5, 2014.
Official Communication in New Zealand Application No. 628840 dated Aug. 28, 2014.
"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.
Barnes et al., "Viewshed Analysis", GIS-ARC/INFO 2001, <www.evsc.virginia.edu/~jhp7e/evsc466/student_pres/Rounds.pdf>.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Ghosh, P., "A Solution of Polygon Containment, Spatial Planning, and Other Related Problems Using Minkowski Operations," Computer Vision, Graphics, and Image Processing, 1990, vol. 49, pp. 1-35.
Gorr et al., "Crime Hot Spot Forecasting: Modeling and Comparative Evaluation", Grant 98-IJ-CX-K005, May 6, 2002, 37 pages.
Haralick et al., "Image Analysis Using Mathematical Morphology," Pattern Analysis and Machine Intelligence, IEEE Transactions, Jul. 1987, vol. PAMI-9, No. 4, pp. 532-550.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.

(56) References Cited

OTHER PUBLICATIONS

POI Editor, "How to: Create Your Own Points of Interest," <http://www.poieditor.com/articles/how_to_create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
Valentini et al., "Ensembles of Learning Machines", M. Marinaro and R. Tagliaferri (Eds.): WIRN VIETRI 2002, LNCS 2486, pp. 3-20.
VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
IBM—i2 Integrated Law Enforcement, https://www-03.ibm.com/software/products/en/integrated-law-enforcement, as printed Feb. 15, 2017 in 2 pages.
IBM—i2 Analyze, https://www-03.ibm.com/software/products/en/i2-analyze, as printed Feb. 15, 2017 in 2 pages.
IBM—Data analysis—i2 Analyst's Notebook, http://www-03.ibm.com/software/products/en/analysts-notebook, as printed Feb. 16, 2017 in 2 pages.
Visual Analysis, "Overview of merging timeline charts and creating hybrid charts," available at https://www.youtube.com/watch?v=dl6jzNtEVpA, as published on Mar. 9, 2015.
IBM Analytics, "IBM i2 Intelligence Analysis Portfolio Overview," available at https://www.youtube.com/watch?v=ElFu_oUiaBY, as published on Sep. 24, 2015.
i2—An IBM Company, "IBM i2 Intelligent Law Enforcement Demo," available at https://www.youtube.com/watch?v=_KCXZ2iTMXQ, as published on Dec. 3, 2012.
Yair Shaked, "IBM i2 Enterprise Insight Analysis—cyber Demo," available at https://www.youtube.com/watch?v=ZXmTWKqkfF4, as published on Nov. 19, 2015.
Visual Analysis, "Overview of importing data and creating timelines," available at https://www.youtube.com/watch?v=SovxKrvkZZs, as published on Mar. 9, 2015.
IBM Corporation, "IBM i2 Analyst's Notebook," Aug. 2015, in 4 pages.
IBM Corporation, "IBM i2 Analyst's Notebook Connector for ESRI," May 2012, in 3 pages.
IBM Corporation, "IBM i2 Enterprise Insight Analysis V2.0 delivers a modern contextual user interface and enhanced software operational warehouse support," http://www-01.ibm.com/common/ssi/ShowDoc.wss?docURL=/common/ssi/rep_ca/2/897/ENUS215-302/index.html&lang=en&request_locale=en, as published on Sep. 1, 2015.
IBM Support, "Software lifecycle—i2 Analyst's Notebook Premium 9.0.0," https://www-01.ibm.com/software/support/lifecycleapp/PLCDetail.wss?q45=I570331B72886X86, as printed Mar. 7, 2017 in 1 page.
IBM Support, "Software lifecycle—i2 Enterprise Insight Analysis 2.0.0," https://www-01.ibm.com/software/support/lifecycleapp/PLCDetail.wss?q45=E170786H45496I53, as printed Mar. 7, 2017 in 1 page.
i2 a ChoicePoint Company, "i2 Analyst's Notebook 7 User Guide: Creating Charts" Jun. 2007, 373 pages.
Gatewaynews, "New Crime Fighting Tool 'Coplink'" available at https://www.youtube.com/watch?v=GbU6E0grnTw, as published on Mar. 8, 2008.
COPLINK, "Incident Analyzer User Guide," created Nov. 5, 2010 (as indicated by the PDF file metadata), 14 pages.
International Search Report and Written Opinion in Application No. PCT/US2009/056703 dated Mar. 15, 2010.
Notice of Allowance for U.S. Appl. No. 13/948,859 dated Dec. 10, 2014.
Notice of Allowance for U.S. Appl. No. 14/319,765 dated Nov. 25, 2016.
Official Communication for Australian Patent Application No. 2010227081 dated Mar. 18, 2011.
Official Communication for Australian Patent Application No. 2010257305 dated Apr. 12, 2011.
Official Communication for Australian Patent Application No. 2010257305 dated Sep. 22, 2011.
Official Communication for European Patent Application No. 08839003.4 dated Jun. 12, 2013.
Official Communication for European Patent Application No. 08839003.4 dated Aug. 14, 2012.
Official Communication for European Patent Application No. 10195798.3 dated May 17, 2011.
Official Communication for European Patent Application No. 12186236.1 dated May 17, 2013.
Official Communication for European Patent Application No. 14159464.8 dated Jul. 31, 2014.
Official Communication for European Patent Application No. 14189347.9 dated Oct. 13, 2017.
Official Communication for Great Britain Patent Application No. 1319225.7 dated May 2, 2014.
Official Communication for Great Britain Patent Application No. 1404457.2 dated Aug. 14, 2014.
Official Communication for New Zealand Patent Application No. 616167 dated Oct. 10, 2013.
Official Communication for U.S. Appl. No. 12/840,673 dated Sep. 17, 2014.
Official Communication for U.S. Appl. No. 12/840,673 dated Jan. 2, 2015.
Official Communication for U.S. Appl. No. 13/728,879 dated Mar. 17, 2015.
Official Communication for U.S. Appl. No. 13/728,879 dated Jan. 27, 2015.

(56) References Cited

OTHER PUBLICATIONS

Official Communication for U.S. Appl. No. 14/319,161 dated Jan. 23, 2015.
Official Communication for U.S. Appl. No. 14/672,009 dated Jul. 14, 2017.
Official Communication for U.S. Appl. No. 14/672,009 dated May 26, 2017.

* cited by examiner

High Priority Calls

| DATE | JOB ID | PRECINCT | PRIORITY ▲ |
|---|---|---|---|
| 08/28/2013 15:07 | 15062513459 | Bronx-044 | 3 |
| 08/28/2013 15:07 | 15062513454 | Manhattan South-010 | 3 |
| 08/28/2013 15:07 | 15062513447 | Queens South-102 | 3 |
| 08/28/2013 15:07 | 15062513446 | Queens North-111 | 3 |
| 08/28/2013 15:06 | 15062513444 | Bronx-043 | 3 |
| 08/28/2013 15:06 | 15062513443 | Bronx-052 | 3 |
| 08/28/2013 15:06 | 15062513436 | Bronx-044 | 3 |
| 08/28/2013 15:06 | 15062513433 | Bronx-043 | 4 |

FIRST   PREV          1 to 20 of 1993          NEXT   LAST

FIG. 3

All Arrests — 840

| DATE ▼ | DESCRIPTION | REGION | PRIORITY | SUBJECTS |
|---|---|---|---|---|
| Nov 27, 2012 | Arrest of Olivia Smith | Raleigh | High | 2 |
| Nov 27, 2012 | Arrest of Juan Block | Detroit | High | 71 |
| Nov 30, 2012 | Arrest of Juan Block | Austin | High | 45 |
| Dec 02, 2012 | Arrest of Bill Atreides | Santa Fe | High | 71 |
| Dec 05, 2012 | Arrest of Juanita Jones | Atlanta | High | 20 |
| Dec 05, 2012 | Arrest of Sally Ingersoll | San Francisco | High | 5 |
| Dec 06, 2012 | Arrest of Olivia Jones | Detroit | High | 98 |
| Dec 06, 2012 | Arrest of Erin Plath | Austin | High | 1 |
| Dec 12, 2012 | Arrest of Laura Jones | Santa Fe | High | 13 |

| FIRST | PREV | 1 to 100 of 152 | NEXT | LAST |

OVERVIEW USER INTERFACE OF EMERGENCY CALL DATA OF A LAW ENFORCEMENT AGENCY

INCORPORATION BY REFERENCE TO ANY PRIORITY APPLICATIONS

This application is a continuation of U.S. application Ser. No. 14/108,187, filed Dec. 16, 2013, which claims the benefit of U.S. Provisional Application No. 61/893,058, filed Oct. 18, 2013, the entire content of which is incorporated herein by reference. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, the present disclosure relates to visualization of law enforcement agency data.

BACKGROUND

Law enforcement agencies (e.g., a police department of a city) can monitor emergency calls in a designated area. Systems and methods for allowing such agencies to better (e.g., more quickly, more accurately, etc.) interact with such data are desired.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to provide a customizable user interface relating to visualization of data associated with a law enforcement agency comprises: one or more hardware computer processors configured to execute code in order to cause the system to: generate a user interface configured to concurrently display a plurality of panels each including a visual representation based on emergency call data of a law enforcement agency, the emergency call data comprising data associated with a plurality of emergency calls, wherein the plurality of panels comprises at least: a first panel displaying a map of a geographical region associated with the law enforcement agency, the map of the geographical region comprising a plurality of selectable precinct indicators representing a corresponding plurality of precincts for which the law enforcement agency has at least some law enforcement responsibilities, the first panel configured to: in response to receiving a selection of a particular precinct indicator corresponding to a particular precinct, update the first panel to display one or more emergency call indicators representing a corresponding one or more emergency calls within the particular precinct; and in response to receiving a selection of a particular emergency call indicator corresponding to a particular emergency call, update the first panel to display information relating to the particular emergency call.

In another embodiment, a method of providing a customizable user interface relating to visualization of data associated with a law enforcement agency comprises: generating, using one or more hardware computer processors, a user interface configured to concurrently display a plurality of panels each including a visual representation based on emergency call data of a law enforcement agency, the emergency call data comprising data associated with a plurality of emergency calls; displaying in the user interface at least a first panel of the plurality of panels, the first panel displaying a map of a geographical region associated with the law enforcement agency, the map of the geographical region comprising a plurality of selectable precinct indicators representing a corresponding plurality of precincts for which the law enforcement agency has at least some law enforcement responsibilities; in response to receiving a selection of a particular precinct indicator corresponding to a particular precinct, updating the first panel to display one or more emergency call indicators representing a corresponding one or more emergency calls within the particular precinct; and in response to receiving a selection of a particular emergency call indicator corresponding to a particular emergency call, updating the first panel to display information relating to the particular emergency call.

In yet another embodiment, a non-transitory computer readable medium comprises instructions for providing a customizable user interface relating to visualization of data associated with a law enforcement agency that cause a computer processor to: generate a user interface configured to concurrently display a plurality of panels each including a visual representation based on emergency call data of a law enforcement agency, the emergency call data comprising data associated with a plurality of emergency calls; display in the user interface at least a first panel of the plurality of panels, the first panel displaying a map of a geographical region associated with the law enforcement agency, the map of the geographical region comprising a plurality of selectable precinct indicators representing a corresponding plurality of precincts for which the law enforcement agency has at least some law enforcement responsibilities; in response to receiving a selection of a particular precinct indicator corresponding to a particular precinct, update the first panel to display one or more emergency call indicators representing a corresponding one or more emergency calls within the particular precinct; and in response to receiving a selection of a particular emergency call indicator corresponding to a particular emergency call, update the first panel to display information relating to the particular emergency call.

BRIEF DESCRIPTION OF THE DRAWINGS

FIG. 3 illustrates one embodiment of a panel for visualization of high priority emergency calls in a geographical area associated with a law enforcement agency.

FIGS. 8A-8I illustrate various panels that can be included in a user interface for visualizing data of a law enforcement agency.

DETAILED DESCRIPTION OF SPECIFIC EMBODIMENTS

Overview

Figure 1:
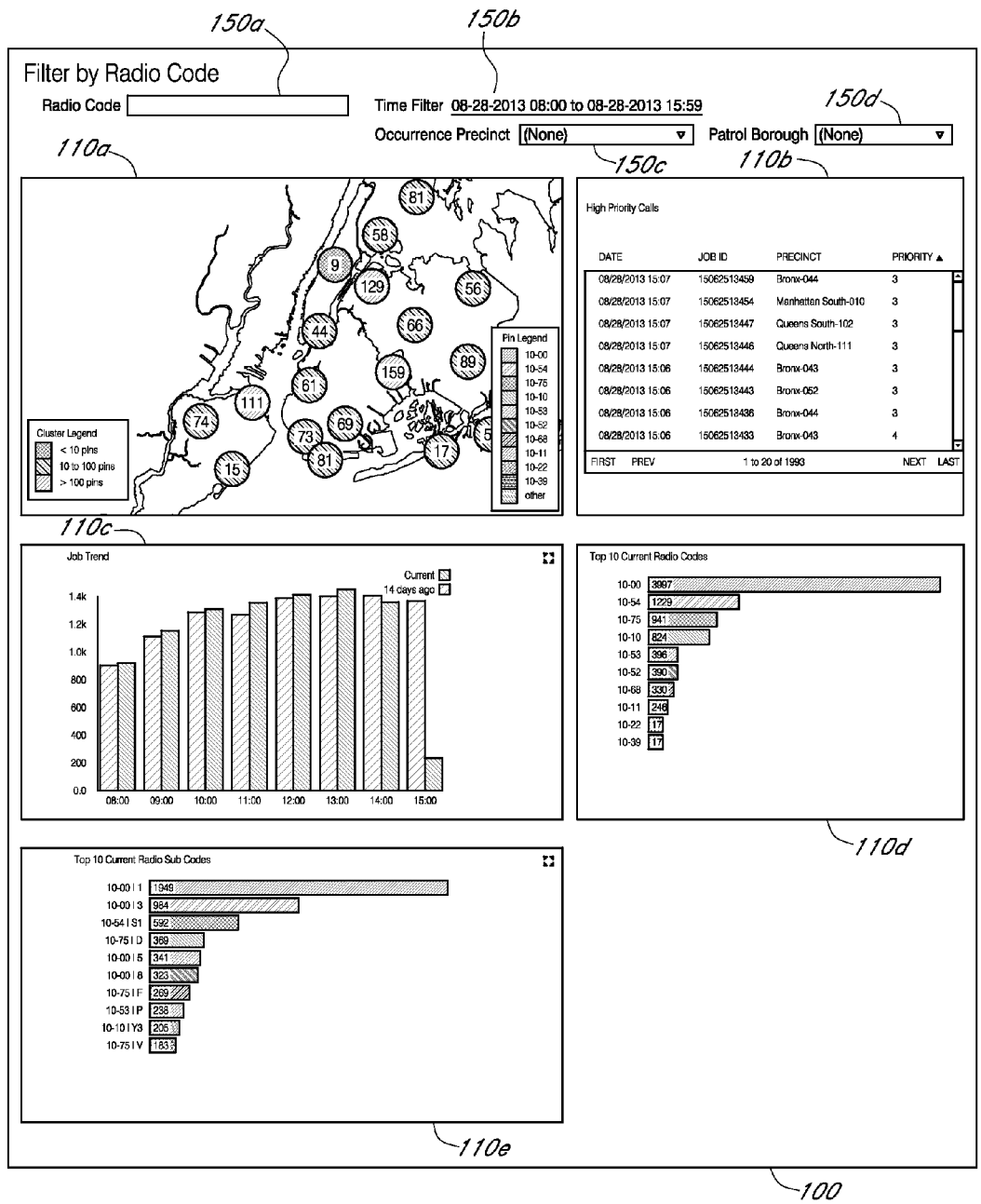
FIG. 1 illustrates one embodiment of a user interface comprising multiple panels for visualizing various aspects of emergency call data of a law enforcement agency.

Techniques in this disclosure may provide a user interface that concurrently displays multiple panels which provide visualization of emergency call data of a law enforcement agency, such as data that is specifically pertinent to a particular agency director/supervisor. For example, the panels on an "executive dashboard," may be customized to include the most relevant/useful data for a particular user, department, or agency, for example. In one embodiment, the panels provide summary data that is useful for a director, supervisor, or other "executive," while still allowing the executive to drill down into the data in order to view detailed information about any summarized data. For example, top officials or decision makers of a law enforcement agency, such as police chiefs or sheriffs, may not be interested in the details of each call, but would want to know which sections or divisions in the geographical area have a high level of unassigned calls.

The user interface can provide a high-level overview of emergency calls in a geographical area that is overseen by the law enforcement agency. Examples of law enforcement agencies include police departments (e.g., NYPD, LAPD, etc.), sheriff's departments, etc. Each panel in the user interface can provide a visualization (e.g., a chart, graph, diagram, list, map, drawing, etc.) indicating aspects related to emergency calls and/or statistics relating to the calls. For example, the user interface can include a panel that displays the number of emergency calls by precinct or section on a map of the geographical area.

A user (e.g., system administrator, analyst, etc.) can customize which panels to include in the user interface and/or customize setting for each panel. For instance, the user can specify which panels should be included in the user interface, dimensions and/or size of a panel, the order in which the panels should be displayed, etc. Then, the user interface can determine the optimal layout and display the panels according to the user specified requirements. In one embodiment, a first user, such as a system administrator, customizes the user interface for use by one or more other users, such as analysts. Alternatively, the user that views and interacts with the user interface may customize the user interface.

The user may apply various types of filters to the data displayed in the user interface, and the panels can update the visualizations according to the filters. For example, the user may wish to view emergency calls in a specific time frame and apply a filter for that time frame, and the visualizations in all or some of the panels can be automatically updated to show the results of applying the filter. The user interface can also provide the ability to show data at various levels of detail within the same user interface. For instance, the user can click on an emergency call in the precinct or section, and the details of the call can be displayed in the same panel. In this manner, the techniques in the disclosure can provide a convenient, digestible overview of tactical and/or strategic data in a single user interface.

In one embodiment, the executive dashboard allows a user to easily identify trends (geographic, temporal, etc.) based on Computer Aided Dispatch (CAD) Job data. Maps allow the user to visualize CAD Jobs geographically, with the option to view the map with a street view or based on precinct zones. Various charts also display time-based trends, allowing users to compare current conditions with conditions from last week (or another time in the past). Filters allow the user to drill down further based on various criteria, including radio code, precinct, and status. These features, as well as others that may be implemented in various embodiments, are discuss further below.

Example Executive Dashboard

FIG. 1 illustrates one embodiment of a user interface 100 comprising multiple panels 110 (including panels 110*a*, 110*b*, 110*c*, 110*d*, and 110*e*) for visualizing various aspects of emergency call data of a law enforcement agency. In the example of FIG. 1, the user interface 100 includes five different panels 110. Each panel is explained in more detail with respect to FIGS. 2-6. The first panel 110*a* is a map of a geographical area under the control of the law enforcement agency. Details relating to the first panel are explained with respect to FIGS. 2A-2E. The second panel 110*b* is a table of high priority calls for the geographical area. Details relating to the second panel are explained with respect to FIG. 3. The third panel 110*c* is a bar chart showing a comparison of number of jobs at current time and a past time. Details relating to the third panel are explained with respect to FIG. 4. The fourth panel 110*d* is a bar chart showing the top radio codes. Details relating to the fourth panel are explained with respect to FIG. 5. The fifth panel 110*e* is a bar chart showing the top radio subcodes. Details relating to the fifth panel are explained with respect to FIG. 6.

As explained above, the panels 110 in the user interface 100 can be customized, and the settings for a panel 110 can also be customized. The user can choose the types of panels 110 that are included in the user interface 100. Some examples of types of panels 110 include, where panels are referenced based on a type of visualization included with the panels: map, table, bar chart, line graph, flow diagram, word cloud diagram, etc. Visualizations may also be referred to as a "visual representations." These types of panels 110 are further explained with respect to FIGS. 2-8. The user may also define the order in which the panels 110 should be displayed. The layout engine for the user interface 100 can display the panels 110 in the order specified. A layout engine can generate or render the user interface 100 and the panels 110 included in the user interface 100.

The user can also specify the dimensions or size for a particular panel 110 and/or multiple or all panels 110. In one embodiment, the size of a panel 110 is defined by number of rows and columns, and the layout engine renders the panels 110 in the user interface 100 based on the size of each panel 110. Specifying in terms of rows and columns may make the process simpler since the user does not have to use pixels. For instance, the rows and columns may be defined by a unit that is associated with a group of pixels. The sizes of panels 110 can be the same or different from each other. In some embodiments, the user may define the number of columns in the user interface 100, and the panels 110 are arranged in columns. The customization setting for the panels 110 may be specified for an individual, a group of individuals, the entire organization, etc.

The user interface 100 may also include one or more filters 150 to apply to the data displayed in the user interface 100. Types of filters can include: keyword filters, date filters, area filters (e.g., precinct or other geographic filters), call information filters (e.g., radio code, caller information, etc), or filters based on any other attribute associated with the emergency call data. Such filters may be configured using any available user interface controls, such as radio buttons, drop-down lists, text entry fields, etc. The example in FIG. 1 includes a radio code filter 150a, a time filter 150b, a precinct filter 150c, and a patrol borough filter 150d. In the radio code filter 150a, the user can type in the radio code of interest (or select via any other user interface controls), and the user interface 100 filters the results in one or more panels 110 according to the radio code. The radio code filter 150a may accept one or more radio codes. A "radio code" may refer to a code used by a law enforcement agency to indicate a specific type of situation and/or action. For example, a particular radio code can indicate robbery or burglary. In one embodiment, radio codes may be grouped such that the user (e.g., an executive) can filter data included in the various panels based on a group identifier (e.g., violent crimes) that include multiple radio codes.

The time filter 150b can accept a time frame or time period from the user. The time frame may be a range, a specific time, or a specific date. The time filter 150b can be selected using a date picker, a drop down menu that provides a list of time frames as options, or other user interface controls. The precinct filter 150c and the patrol borough filter 150d can filter the data by precinct and by patrol borough, respectively. They may be drop down menus (or other user interface controls) that provide a list of precincts and a list of patrol boroughs. In one example, a patrol borough consists of one or more precincts (e.g., in New York City). The list of precincts provided by the precinct filter 150c can vary based on the borough selected in the patrol borough filter 150d. A "precinct" may refer to a geographical section or division within a geographical area that is served by or is under the jurisdiction of a particular law enforcement agency. Different terms may be used by various law enforcement agencies to refer to such geographical section or division within the geographical area (e.g., "area", "division," etc.).

The type and/or content of information displayed in the panels 110 and/or the user interface 100 may vary depending on the requirements of a law enforcement agency. For example, one law enforcement agency could be interested in viewing emergency call data; this law enforcement agency may want to view data for various precincts and quickly determine which precincts have a backlog in terms of resource assignment. The user interface 100 and the panels 110 can show which precincts have a high number of jobs that are not assigned to a resource. On the other hand, another law enforcement agency might be more interested in viewing arrest data. Examples of user interface and panels displaying arrest data are discussed in detail in connection with FIGS. 7-8.

Figure 10:
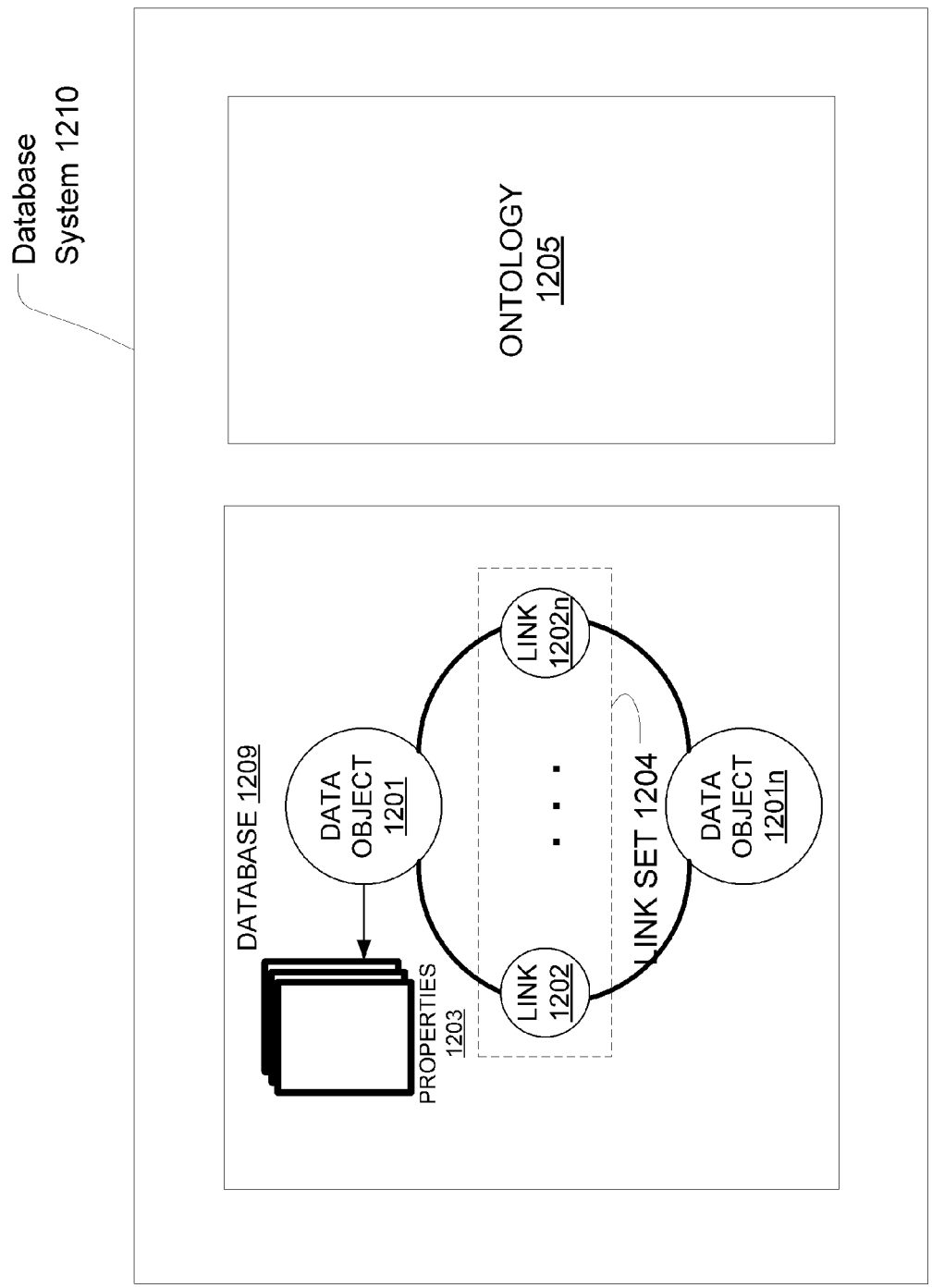
FIG. 10 illustrates one embodiment of a database system using an ontology.
Figure 11:
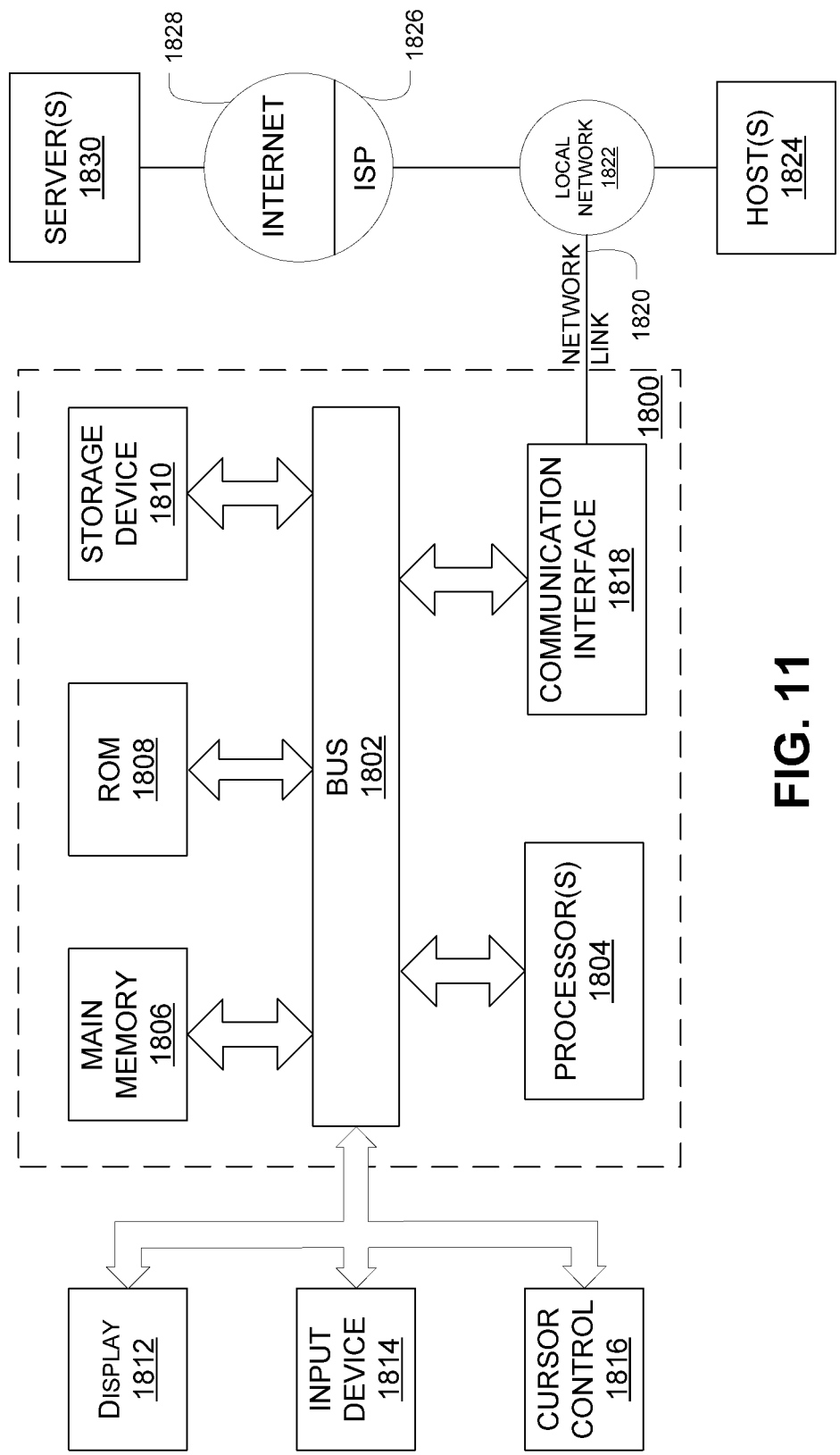
FIG. 11 illustrates a computer system with which certain methods discussed herein may be implemented.

The user interface 100 may be generated by systems described with respect to FIGS. 10-11. Such systems can be based on object-centric data models. For example, any data displayed in the user interface 100 may be represented by data objects, links, relationships, etc. as explained with respect to FIGS. 10-11. In some embodiments, the user interface 100 can be provided in connection with the systems described in connection with FIGS. 10-11. For instance, the user interface 100 may be implemented as an overview layer for such systems, e.g., based on the data of the systems. The user interface 100 can be generated by a platform configured to build the overview layer. Details relating to systems that may generate or create the user interface 100 are further explained with respect to FIG. 7.

A panel 110 can include any type of visualization. For example, the panels 110 in the user interface 100 may include any of the visualizations illustrated in FIGS. 8A-8I, in addition to the visualizations illustrated in FIGS. 2-6. The user interface 100 and the panels 110 in the user interface 110 can be easily configured and customized. The panels 110 may be easily rearranged (e.g., by drag and drop), and the dimensions of the panels 110 can be specified in a simple manner (e.g., by number of rows and columns or resizing with a mouse or touchscreen input). Details regarding customizability of the user interface 110 are further explained with respect to FIGS. 7-8.

Example Drill-Down of Emergency Call Data

FIGS. 2A-2E illustrate one embodiment of a panel 200 for visualizing emergency calls in a geographical area associated with a law enforcement agency at various levels of detail. The panel 200 displays a map 260 of a geographical area under the control of the law enforcement agency, which can provide a high-level overview of emergency call activity in the area, while allowing the user to zoom in on particular areas to be provided with lower-level details. Moving from general information to more detailed information may be referred to as "drilling down." The panel 200 can provide the ability to drill down within the actual panel 200, which may be one of multiple panels included in an executive dashboard.

Figure 2A:
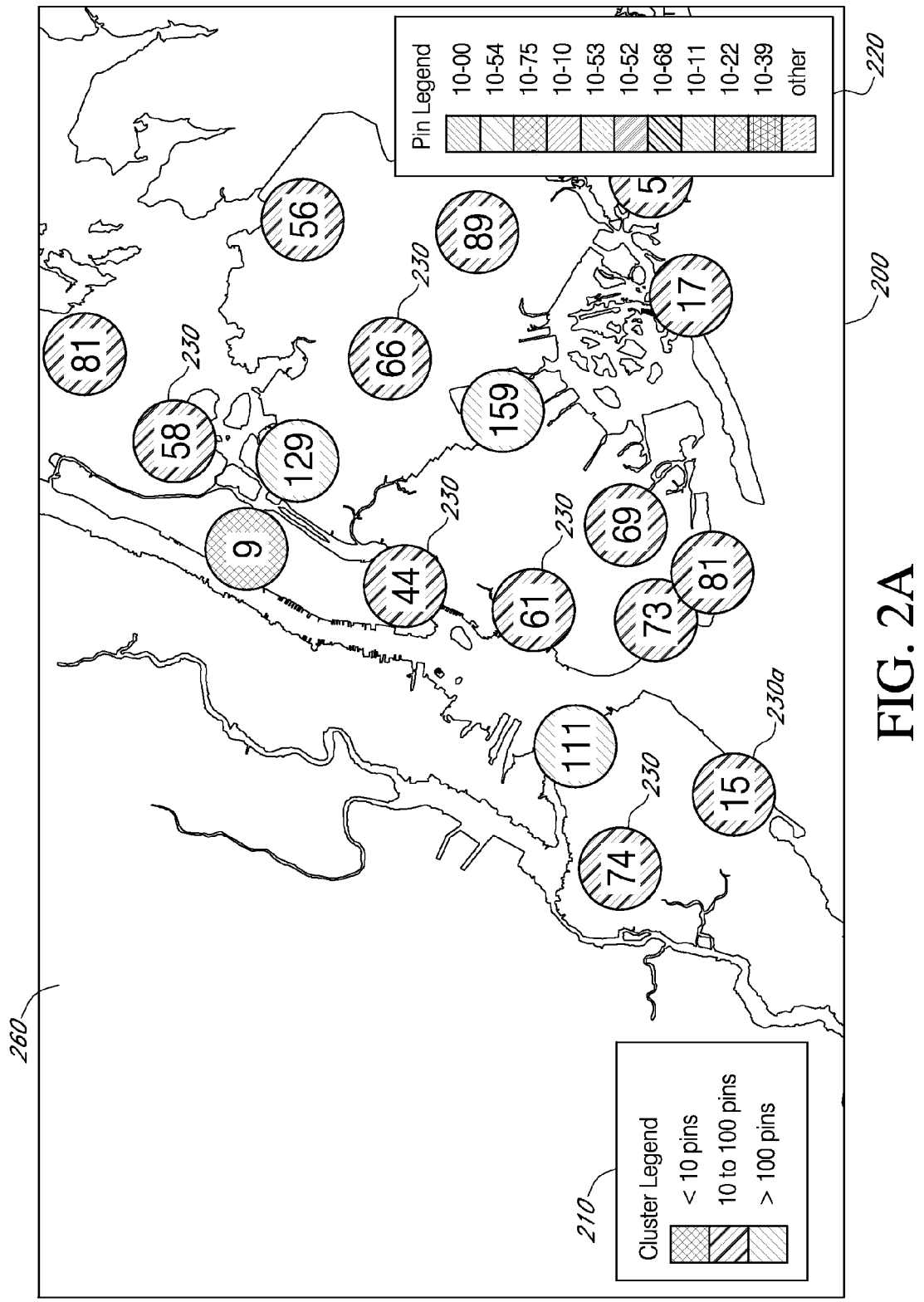
FIGS. 2A-2E illustrate one embodiment of a panel for visualizing emergency calls in a geographical area associated with a law enforcement agency at various levels of detail.

In FIG. 2A, the panel 200 displays a map 260 of precincts that are under the jurisdiction of the law enforcement agency. The number of emergency calls for a precinct can be shown in circles or orbs 230. For example, the number for circle 230a is "15," which indicates that the current number of emergency calls in that precinct is 15. The circles 230 may serve as visual indicators for different precincts and may be selectable. In some embodiments, other indicators of data associated with particular precincts may be used, such as other shapes, overlays, etc. For example, in one embodiment, a precinct area on a map may be overlaid with a color, gradient, shading, etc. to indicate data associated with the precinct (e.g., color may be shaded differently based on quantity of calls in a precinct relative to other precincts) and/or selection of a precinct. The circles 230 may be color coded or otherwise distinguished (e.g., by pattern) according to the value of the number. A legend 210 may provide an explanation for a color or a pattern. In FIG. 2A, the patterns indicate a quantity of calls within each area. In this example, a first pattern in the legend 210 refers to less than 10 emergency calls; a second pattern refers to between 10 and 100 calls; and a third pattern refers to more than 100 calls. Depending on the embodiment, patterns may be replaced with or supplemented by other visual indications, such as different colors of circles (or other shaped indicator), font changes, blinking text/circles, etc. Furthermore, in some embodiment, the pattern criteria may be user defined and/or automatically adjusted by the system. For example, a user may adjust patterns (or colors or other visual indicators) to distinguish between precincts having less than 20, between 20 and 200, and more than 200. In one embodiment, the system may automatically select the most informative ranges based on quantities of calls in various precincts, for example. In some embodiments, the patterns (or other visual indicators) may be based on percentages (e.g., calls per population of a precinct) or other parameters. FIGS. 2A-2D use the term "pin," which may refer to a visual indicator that represents a particular emergency call. FIG. 2A does not include any pins, but shows another legend 220 that provides explanations for colors or patterns used for the pins.

Figure 2B:
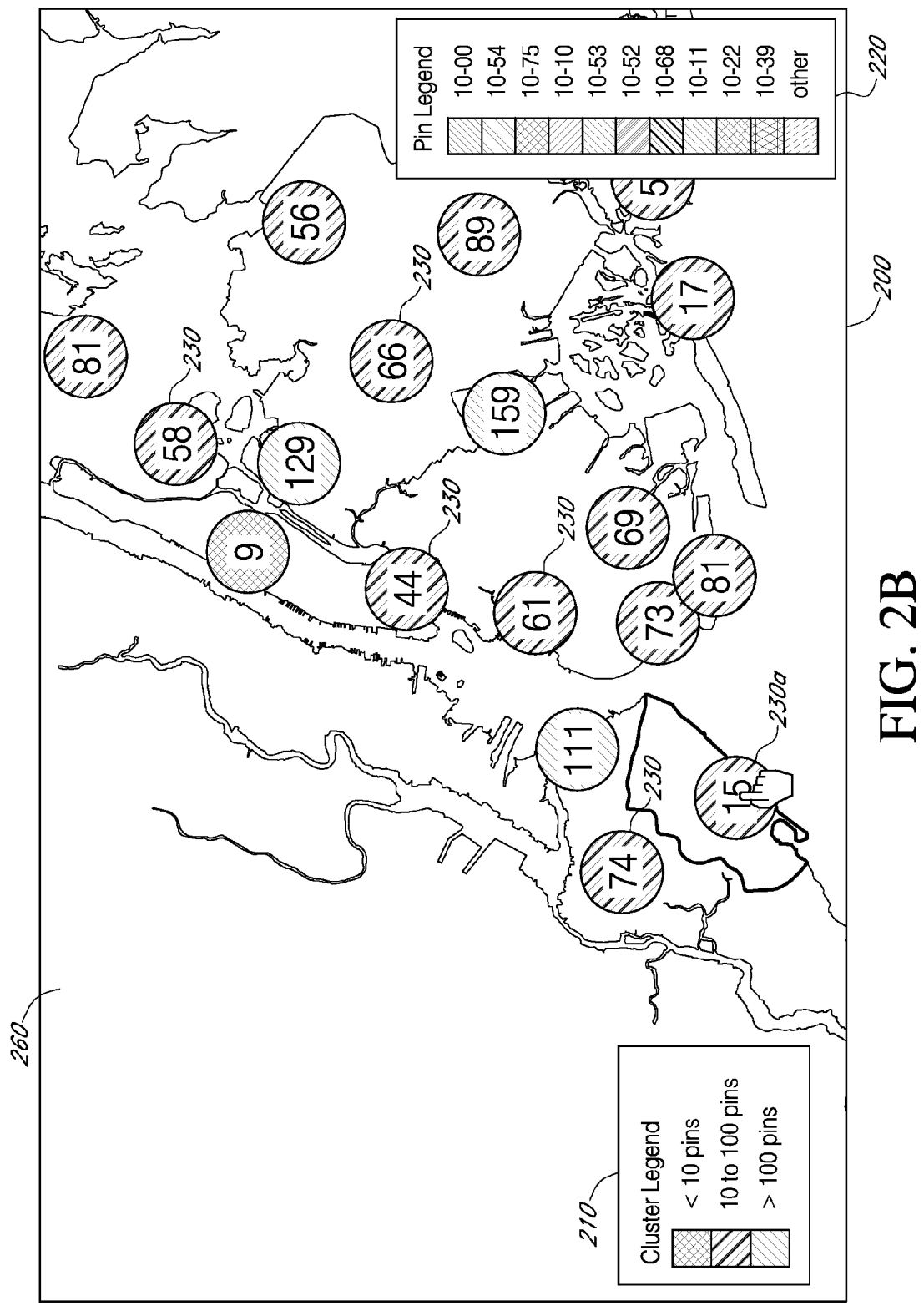
Figure 2C:
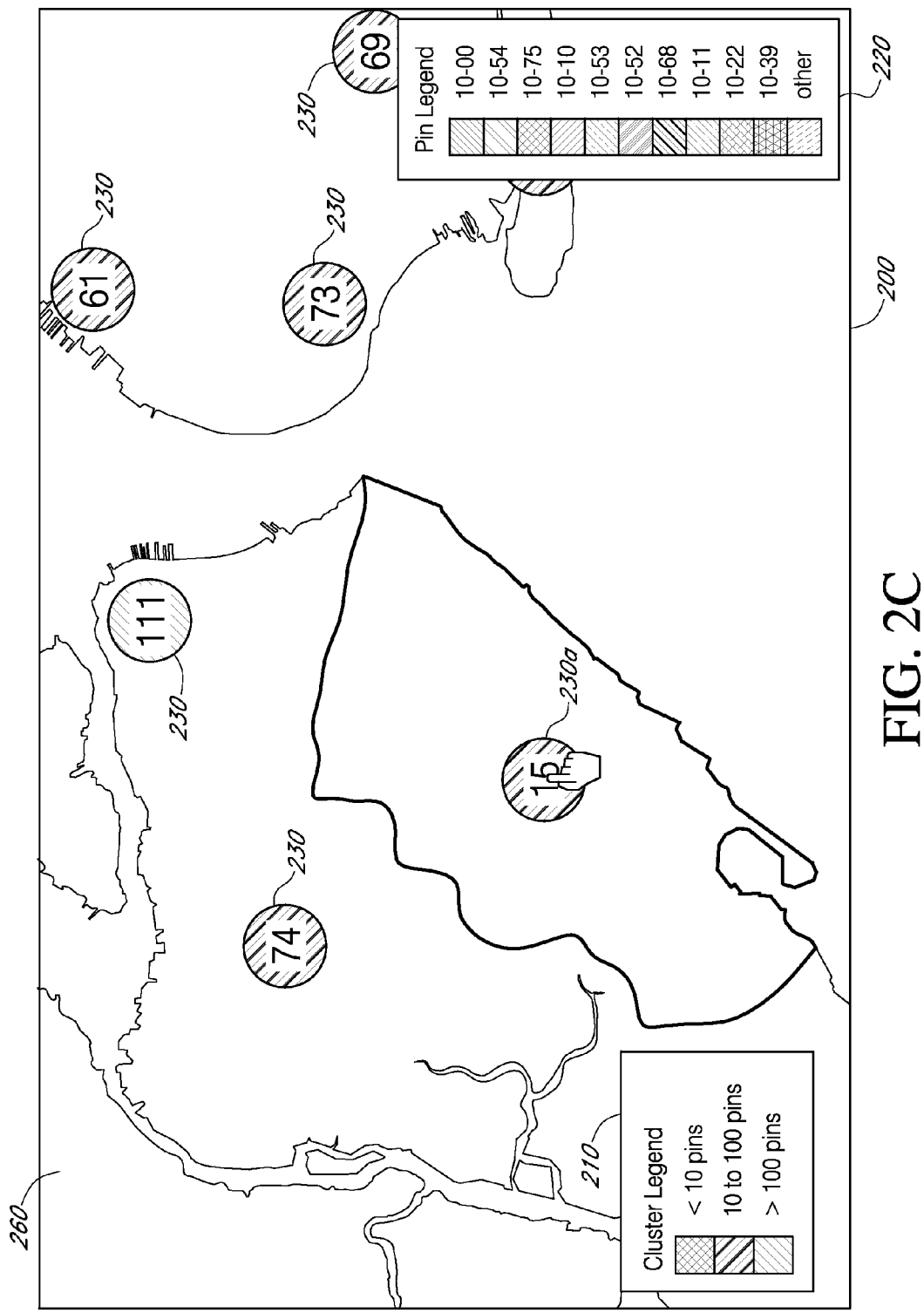

FIG. 2B illustrates the same panel 200 as in FIG. 2A, now with a particular precinct selected on the map 260 in the panel 200. For example, the user hovers over the circle 230a (with a mouse pointer, touchscreen, or other input device) for a precinct, and the boundary for that precinct is indicated on the map 260. The user can click on the circle 230a to select the precinct. FIG. 2C illustrates the panel 200 after the user has selected circle 230a, wherein the panel 200 now includes a magnified view of the geographic area of the precinct associated with circle 230a and the surrounding area.

Figure 2D:
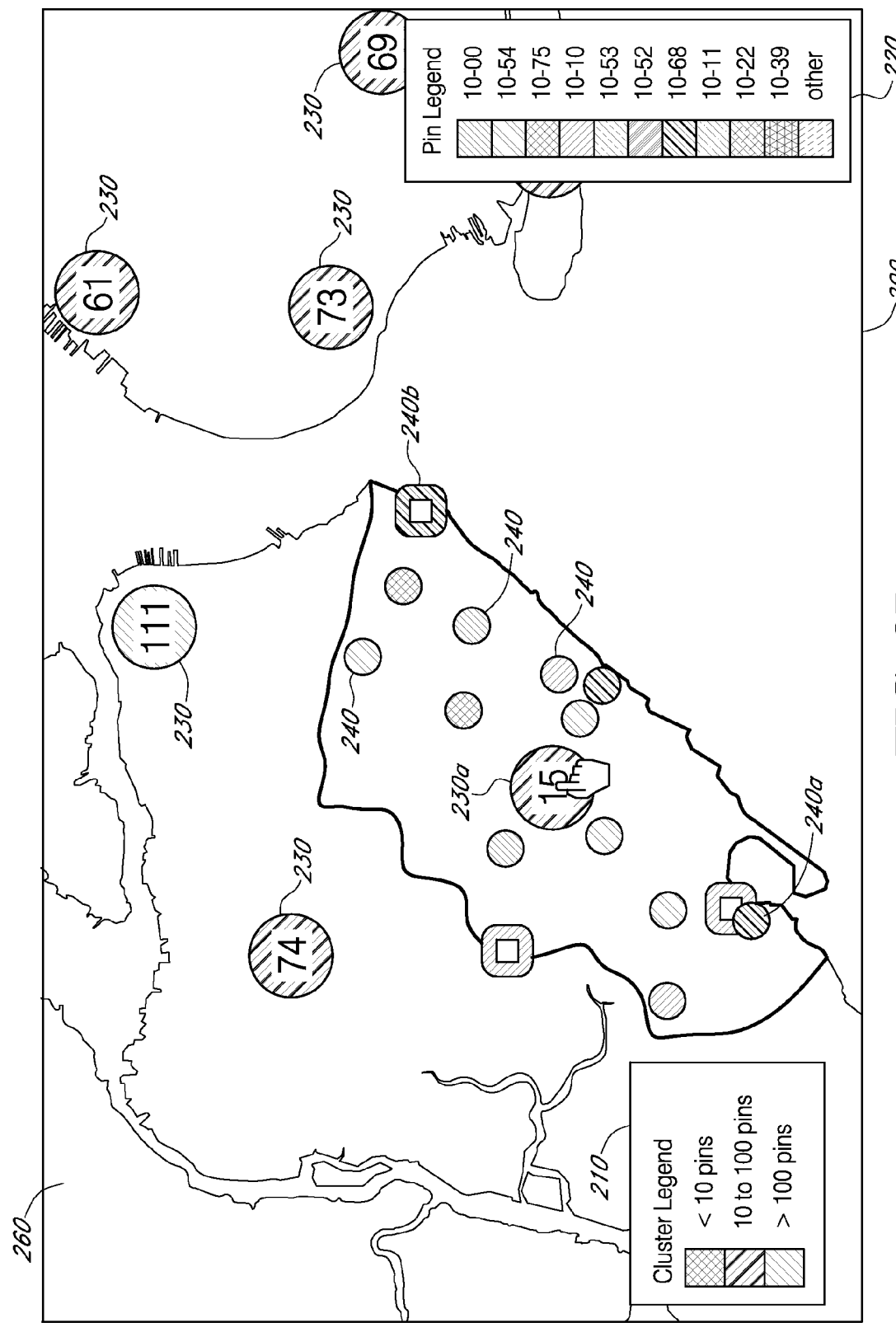

FIG. 2D illustrates the panel 200 updated so the map 260 displays the pins representing emergency calls within the particular selected precinct (associated with circle 230a in this example). In this embodiment, emergency calls can be represented by visual indicators, which can be referred to as "pins" as explained above, and the pins 240 can be color-coded or otherwise distinguished (e.g., by pattern) according to type of the emergency call, time call has been open, urgency of call, and/or other characteristics of the call. The legend 220 can provide information relating to each color or pattern used for pins 240. The pin details illustrated in FIG. 2D may be displayed in response to the user selecting the circle 230a for the precinct in the panel 200 of FIG. 2C or may be displayed initially when the map is magnified in response to selecting circle 230a in the panel 200 of FIG. 2B.

In FIGS. 2A-2D, the legend 220 lists the radio codes used to classify the emergency calls. The pins 240 may have different shapes. For example, square pins 240b may be used to indicate emergency calls that occurred within the past hour, whereas circular pins 240a may be used as the default shape.

Figure 2E:
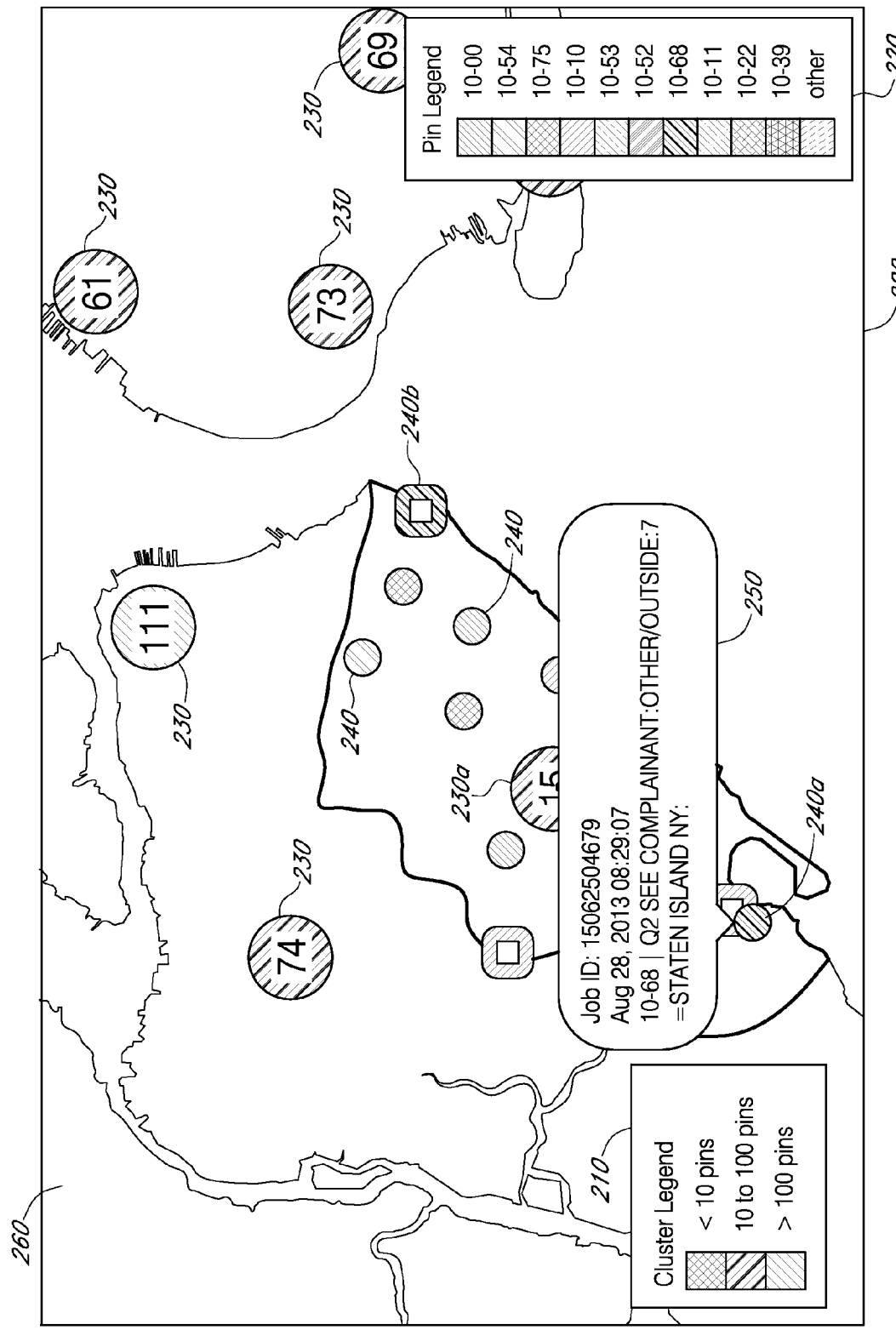

FIG. 2E illustrates the panel 200 displaying details relating to an emergency call when the user clicks on (or hovers over or otherwise selects) a particular pin 240a. In this embodiment, the details are displayed near the pin 240a. The details may include the job number, the time and date of the job, location of the job, comments, etc. A job may be created for one or more emergency calls, and the law enforcement agency may manage various emergency calls by handling and processing the jobs. In this manner, the user interface 100 can display general information and detailed information in the same panel 200. More detailed information may be displayed in a separate window within the panel 200. For example, the emergency call can be represented as an object by the system that provides the user interface, and a separate pop-up window can be displayed to show various properties relating to the object. The window can have some degree of transparency so that it does not block the visualization behind it. The separate window may be referred to as the "object inspector."

If any filters are applied in the user interface, as in FIG. 1, the data in the panel 200 may be filtered accordingly. For example, the emergency calls displayed in the panel 200 may be calls for a particular time frame (e.g., a specific shift of the police department). In certain embodiments, the map 260 may include other features and functionalities described in co-pending U.S. patent application Ser. No. 13/917,571, filed Jun. 13, 2013, entitled "INTERACTIVE GEOSPATIAL MAP," which is incorporated by reference in its entirety.

Other Example Panels

FIG. 3 illustrates one embodiment of a panel 300 for visualization of high priority emergency calls in a geographical area associated with a law enforcement agency. Priority can refer to the urgency or importance level of a job. Lower numbers may indicate higher priority. In some implementations, priority is determined based on the radio code, such as automatically by the system (e.g., radio codes are mapped to priorities so that the system can automatically look up a priority when a radio code is known) or manually by the dispatch operator, for example. The priority can be updated based on circumstances related to a call, such as by officers on the scene or by changing events. In the embodiments discussed herein, lower numbers indicate higher priorities, but in other embodiments different priority scales and orders may be used to distinguish priorities of particular calls.

In the example of FIG. 3, the panel 300 is a table or tabular visualization. In FIG. 3, the panel 300 provides a table 310 of high priority calls. The table 310 can be organized as a number of pages, and one page may be displayed at a time. Multiple pages of the table 310 can be navigated using "prev," "next," "first," and "last" buttons. Each page in the table may be scrollable within the panel 300. The information in the table 310 can be displayed in rows and columns. Types of information displayed in the table 310 can include date, job ID or number, precinct, priority, etc. The table 310 can support sorting, and the emergency calls in the table 310 may be sorted based on priority. For example, the table 310 displays the calls with higher priority (e.g., priority level "3" in FIG. 3) first, then displays the calls with lower priority (e.g., priority level "4"). The calls may be sorted by priority and then sorted by time within the same priority level. The example of FIG. 3 shows calls with priority level "3" first, and within the calls having priority level "3", more recent calls are listed first.

Figure 4:
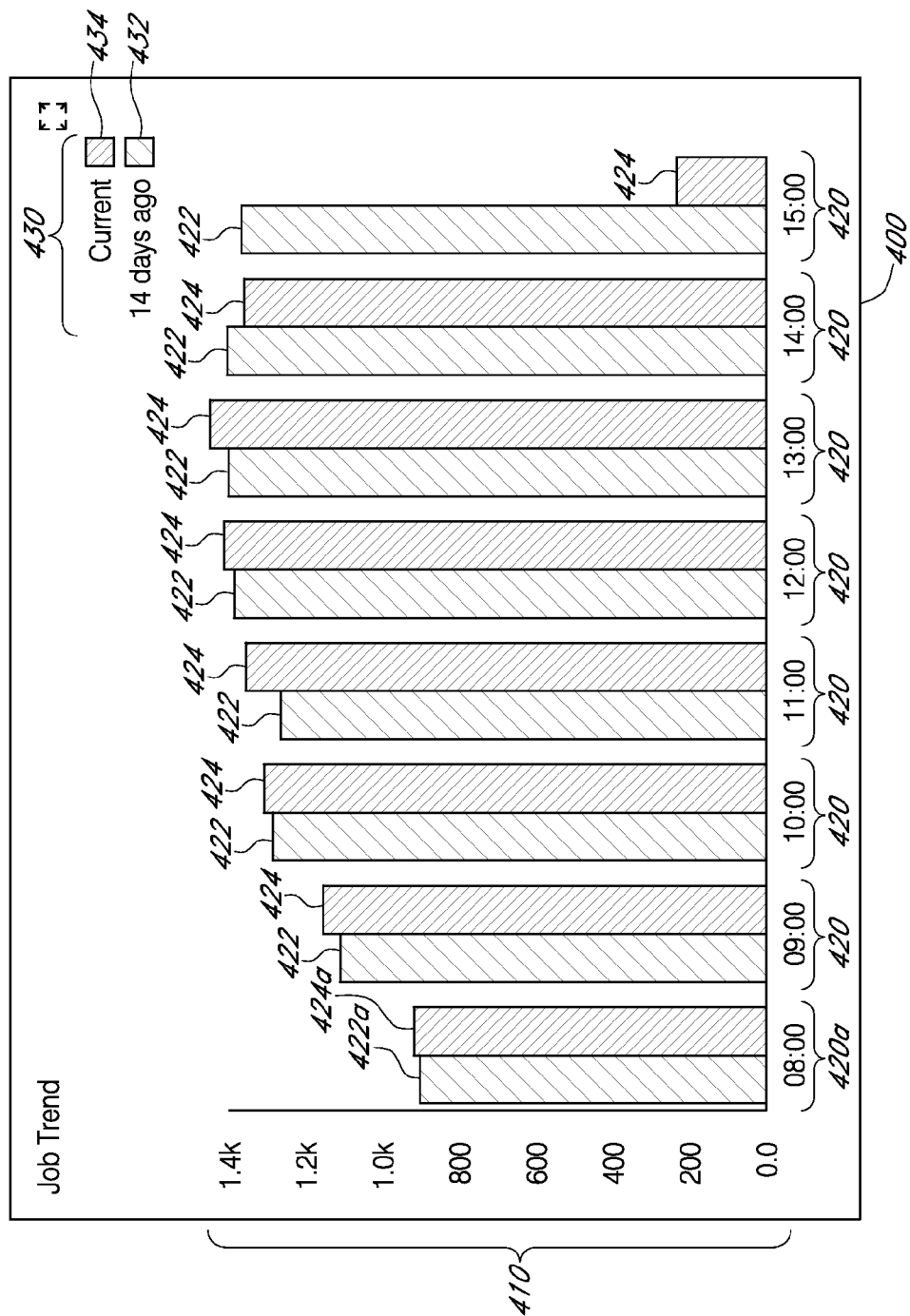
FIG. 4 illustrates one embodiment of a panel for visualization of statistics comparing past jobs and current jobs.

FIG. 4 illustrates one embodiment of a panel 400 for visualization of statistics comparing past jobs and current jobs. Law enforcement agencies may be interested in seeing trends for number of jobs over time, which may be referred to as historical trends. As explained above, a job may be created for each emergency call, and the law enforcement agency can process the jobs to handle the emergency calls. For example, a particular law enforcement agency might want a comparison of current jobs and jobs from two weeks prior. The panel 400 provides a bar chart 410 of past jobs and current jobs. The law enforcement agency can select a time in the past for the comparison and/or a default time is automatically selected. The x-axis for the bar chart 410 indicates time periods of a day, and the y-axis represents the number of jobs. In the example of FIG. 4, the maximum number of jobs on the y-axis is 1,400. In the panel 400, each set of bars 420 represents the number of current jobs and the number of past jobs at a certain time in the day. In particular, the first set of bars 420a illustrates jobs from 14 days ago during the 8-9 am time period as bar 422a and jobs on the current day during the 8-9 am time period as bar 424a. In this embodiment, similar bars for the previous and current period during different hourly periods are illustrated. The bars for past jobs 422 and the bars for current jobs 424 can be distinguished by color or pattern. The legend 430 can include an explanation for a particular color or pattern. The pattern 432 indicates past jobs, and the pattern 434 indicates current jobs.

Figure 5:
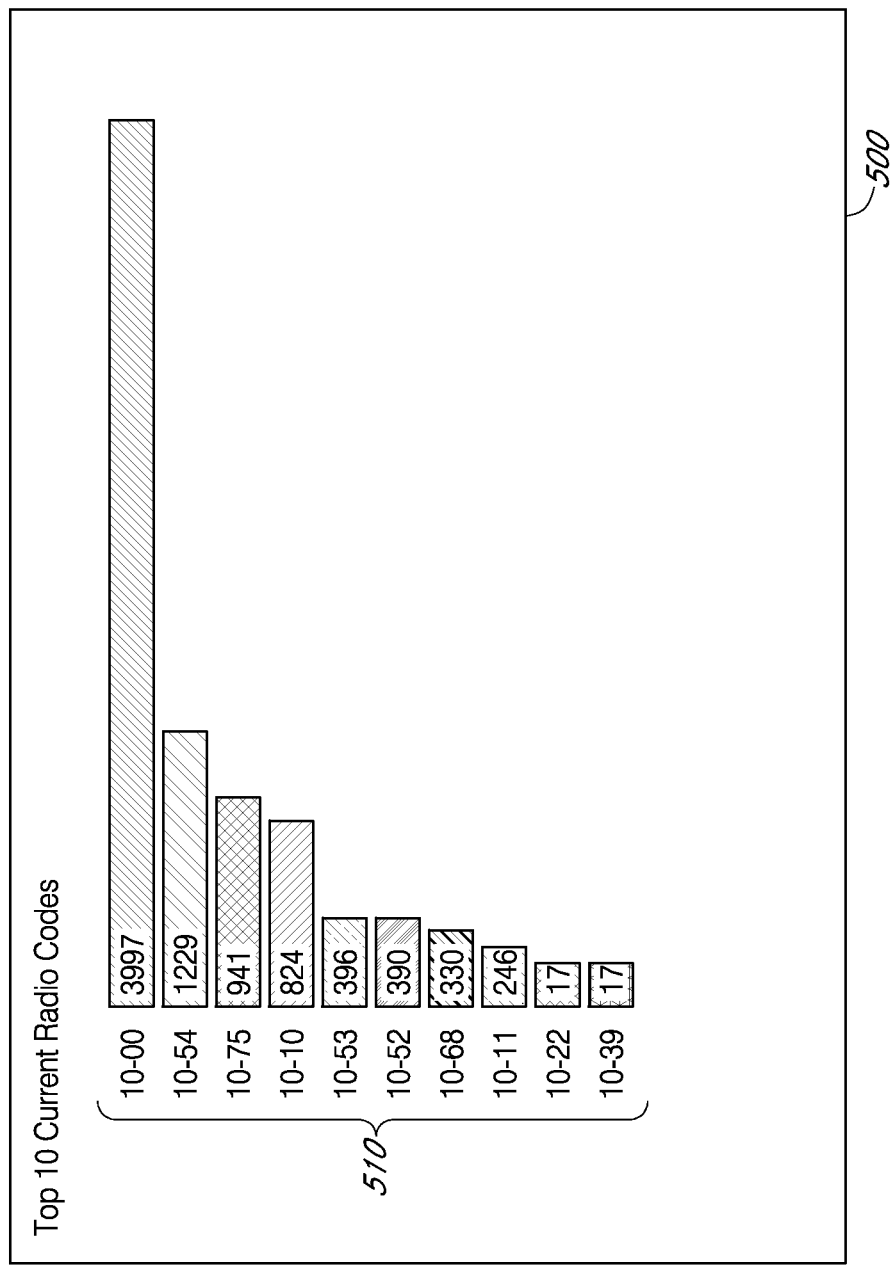
FIG. 5 illustrates one embodiment of a panel for visualization of statistics relating to common radio codes.

FIG. 5 illustrates one embodiment of a panel 500 for visualization of statistics relating to common radio codes. The panel 500 provides a bar chart 510 for top ten radio codes. As mentioned above, radio codes can signify different types of situations and/or responses. For example, "10-54" refers to ambulance calls, "10-53" refers to vehicle accidents, and "10-10" refers to general crimes (e.g., shoplifting, shots fired, suspicious vehicle, etc.). The top ten radio code bar chart 510 can provide an overview of which types of jobs being dispatched are most common at a glance. Depending on the filters that are applied, the panel 500 may show the top ten radio codes for a patrol borough, a precinct, a time frame, etc.

Figure 6:
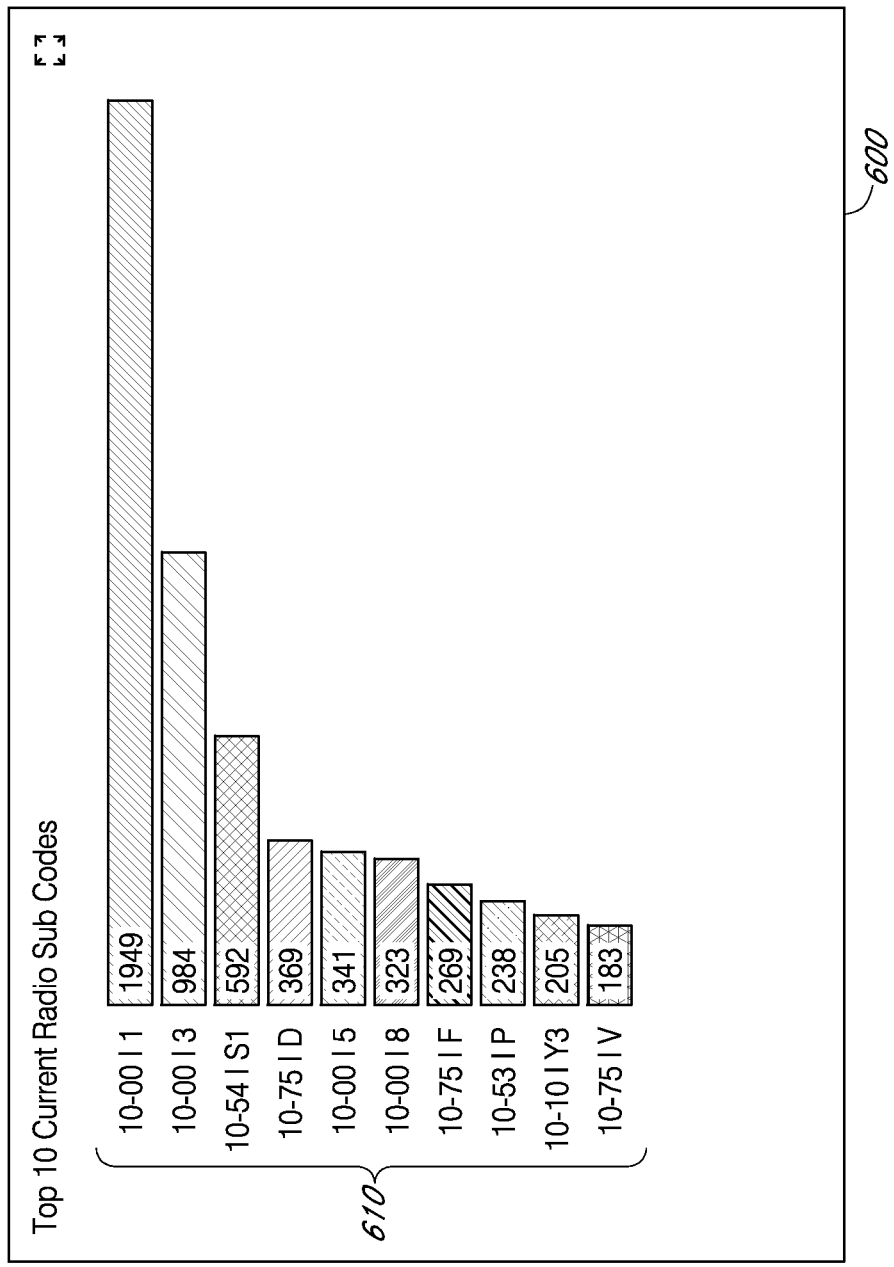
FIG. 6 illustrates one embodiment of a panel for visualization of statistics relating to common radio subcodes.

FIG. 6 illustrates one embodiment of a panel 600 for visualization of statistics relating to common radio subcodes. The panel 600 provides a bar chart 610 for the top ten radio subcodes. The bar chart 610 can be similar to the bar chart 510 in FIG. 5. The bar chart 610 for top ten radio subcodes can provide further details on which types of jobs are more common within particular radio codes. As in FIG. 6, the most common subcodes may be from the same radio code. Depending on the filters that are applied, the panel 600 may show the top ten radio subcodes for a patrol borough, a precinct, a time frame, etc.

Example Executive Dashboard

Figure 7:
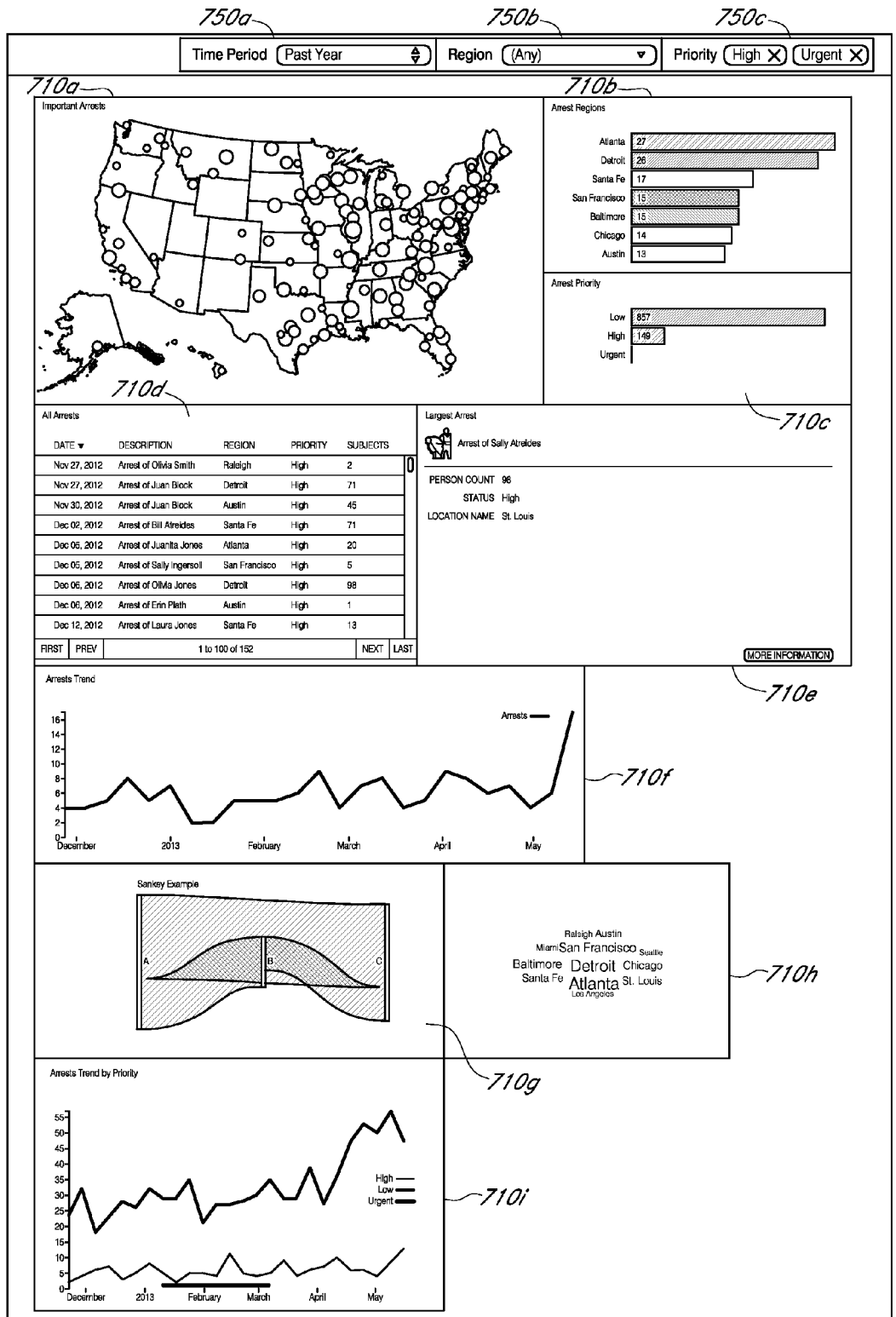
FIG. 7 illustrates another embodiment of a user interface comprising multiple panels for visualizing data of a law enforcement agency.

FIG. 7 illustrates another embodiment of a user interface 700 comprising multiple panels 710 for visualizing data of a law enforcement agency, referred to as an Executive Dashboard. FIG. 7 uses arrest data for illustrative purposes, but the user interface 700 can also be used to display emergency call data. Similar to the user interface 100 in FIG. 1, the user interface 700 includes multiple panels that provide various information related to law enforcement activities. However, user interface 700 includes different types of information in different panels that are of interest to the particular executive that views the user interface 700. Accordingly, the executive dashboard system allows different users to focus on types of information that are most important to the particular user, and panels included on such executive dashboards may vary between law enforcement agencies and even between different users within a same law enforcement organization (e.g., two detectives in a police department may have different panels on their executive dashboards). As another example, two police departments in different regions of the U.S. could be interested in showing different types of information in the user interface 700 or user interface 100. The user interface 700 illustrates additional panels that are not included in user interface 100 and, as discussed herein, other user interfaces may be configured to include any portion of the panels discussed with references to FIG. 1 or 7.

In the example of FIG. 7, the user interface 700 includes nine different panels 710. Each panel 710 can include a visualization relating to the data of the law enforcement agency. The panels 710 are explained in more detail with respect to FIGS. 8A-8I. The panel 710a provides a map of important arrests in a geographical area (e.g., the U.S). The panel 710b provides a bar chart showing arrests by region. The panel 710c provides a bar chart showing arrest priority. The panel 710d includes a table of high priority calls for the geographical area. The panel 710e is an information panel showing brief details of the largest arrest. The panel 710f includes a line graph or time series chart showing arrest trend. The panel 710g includes a sankey or flow diagram. The panel 710h shows a word diagram or a word cloud diagram. The panel 710i shows another line graph or time series chart showing arrest trend by priority. Details relating to the panels 710a-710i are explained with respect to FIGS. 8A-8I, respectively.

Other types of visualizations can include a line graph, object summary, pie chart, time wheel, time series chart, etc. A time wheel may refer to a circular representation of a unit of time (e.g., an hour, a day, a week, a month), which may be subdivided into smaller units of time. The panels 710 can be similar to the panels 110 in the user interface 100. A panel 710 can include any type of visualization. For example, the panels 710 in the user interface 700 may include any of the visualizations illustrated in FIGS. 2-6, in addition to the visualizations illustrated in FIGS. 8A-8i. The panels 710, 110 can update or refresh periodically (e.g., at a specified interval), in response to an action or an input (e.g., keywords in a keyword filter), in response to changes in information in another panel 710, 110 (e.g., from application of one or more filters), etc.

Similar to FIG. 1, the user interface 700 can also include one or more filters 750 to apply to the data displayed in the user interface 700. Types of filters can include: keyword filters, multiple value filters, date filters, etc. The example in FIG. 7 includes a time filter 750a, a region filter 750b, and a priority filter 750c. The time filter 750a can accept a time frame or time period from the user. In the example of FIG. 7, the time filter 750a is a drop down menu, and "past year" is selected as the relevant time frame. The region filter 750b may also be a drop down menu, but in the example of FIG. 7, no value is selected for the region. Therefore, the data shown in the user interface 700 is not filtered for a particular region. The priority filter 750c may be a multi-value filter that can accept multiple values. Here, selected priority levels are "high" and "urgent."

The user interface 700 can be configured so that visualizations in all of the panels 710 may be automatically updated (e.g., in realtime). In one embodiment, the visualizations are updated in response to changes to the filter criteria. In another embodiment, only a portion of the panels 710 are updated in response to filter changes, such as a predefined set of panels 710 and/or a user selected group of panels 710. In this way, the user may be able to view unfiltered data in one or more panels 710, while adjusting filters that are automatically applied to other panels 710. In another embodiment, different sets of filters may be applied to different sets of one or more panels 710.

The user interface 700 or the user interface 100 may be implemented as a layer on top of systems using object centric data models as described with respect to FIGS. 10-11. For example, the user interface 700, 100 can be an overview layer that provides a high-level overview of data in the underlying systems. As mentioned above, the overview layer may be referred to as the "executive dashboard" since it displays relevant high-level data in one user interface and can be useful to executives and decision makers. The user interface 700, 100 can be a web interface or a user interface for an application program. The underlying systems may web applications or native applications.

A platform may be provided for building overview layers for object-centric systems. For example, such platform can be provided by the systems described in FIGS. 10-11. The platform may be used to generate the user interface 700, 100. An interface may be provided between the overview layer and the underlying system or data source in order to provide a level of abstraction. By using a standard interface, an overview layer can be compatible with any type of underlying system or data source. For example, abstract forms of filters and data may be provided, and these abstract filters and data can be compatible with systems or data sources using different formats. The data displayed in a single visualization can be obtained from multiple systems or data sources. For example, a time series chart could display the number of current incidents by the hour and also overlay the average number of incidents over a period of several days. In another example, a map might show both emergency calls and arrests.

The platform may also provide general scripts that can be used to create customized user interfaces so that the user does not have to write code. Such scripts can include SQL or proprietary scripts, for example. In some embodiments, the platform provides a configuration plugin template, and the user can use a command line to start implementing the overview user interface or the executive dashboard. The template may specify the configurations and/or settings for generating the customized user interface 700, 100. The platform can allow various aspects of the user interface 700, 100 to be configured, such as by using a visualization framework, configuration framework, and/or layout framework. In one embodiment, the visualization framework allows users to implement their own visualizations that can be used in the dashboard. The configuration framework may allow users to implement their own data source and transform the data to be displayed in a visualization. The layout framework may take the requested size of a visualization (e.g., 2 rows high and 2 columns wide) and fit it into the dashboard's layout.

One of the features of the user interface 700, 100 is that customization of panels 710, 110 in the user interface 700, 100 can be simple and easy for the users. The panels 710, 110 may be easily rearranged, and the dimensions of the panels 710, 110 can be specified in a simple manner (e.g., by number of rows and columns). In one embodiment, a panel 710, 110 can be dragged to a location within the user interface 700, 100 to arrange its position. In another embodiment, the user can add or select panels 710, 110 of the user's choice to create a customized user interface 700, 100 (e.g., in real-time). The user interface 700, 100 may be a web interface.

Other aspects of the user interface 700, 100 may also be configured and customized. Such aspects can include pages, page layout, security settings, visualizations, etc. In some embodiments, the user interface 700, 100 are organized as multiple pages, and one page of the user interface 700, 100 may be displayed at one time. The different pages may be grouped by categories. Similarly, the panels 710, 110 can be grouped by categories. Access or security settings may be specified for a group of pages or panels 710, 110, and only those with the access privileges may be able to view a certain page or panel 710, 110. For example, if a user does not have access rights to a particular panel 710, 110, the user interface 700, 100 would not display the panel 710, 110 for that user. The features of a visualization could also be customized. For example, the user can specify the maximum length of a bar in a bar chart within the panel 710, 110 or the colors used for the bars.

In certain embodiments, the user interface 700, 100 detects or is otherwise aware of the user interface mode in which it is displayed and adjusts the way the user interface 700, 100 is presented on a display device. For example, the user interface 700, 100 may be displayed in full screen mode. The user interface mode ("UI mode") can be designated by a specific application. For large screens (e.g., 10-foot display), the user interface 700, 100 could be displayed for showcasing purposes, rather than (or in addition to) performing daily operations. In such case, the user interface 700, 100 can be adjusted to be more fitting for large screens. The UI mode for displaying on large screens may be referred to as "large screen mode" or "10-foot mode." In large screen mode, the user interface 700, 100 may not concurrently display the panels 710, 110, but instead rotate one or more panels 710, 110 at an interval. Also, filters 750, 150 may not be displayed, and fewer details may be shown in the user interface 700, 100 and/or the panels 710, 110. Text and/or graphical elements can be larger so they can be seen from a distance. Each panel 710, 110 may also know about the UI mode and adjust itself to be more appropriately displayed in a selected UI mode.

Figures have been explained with respect to law enforcement agencies, but the user interfaces described in this disclosure may be used by other types of organizations. Some examples include fire departments, offices of mayors, etc. Fire departments may use the overview user interface to track service calls. A mayor's office may use the overview user interface to manage building jobs and building complaints. For example, by viewing the building jobs and building complaints in the same panel or user interface, the mayor's office can note any correlations between the jobs and the complaints at a glance. As explained above, the techniques of this disclosure may provide a user interface 700, 100 that can be easily configured and customized and that can display a customizable overview of high-level data. The overview data can assist decision makers in obtaining relevant data at a glance and making informed decisions.

Figure 8A:
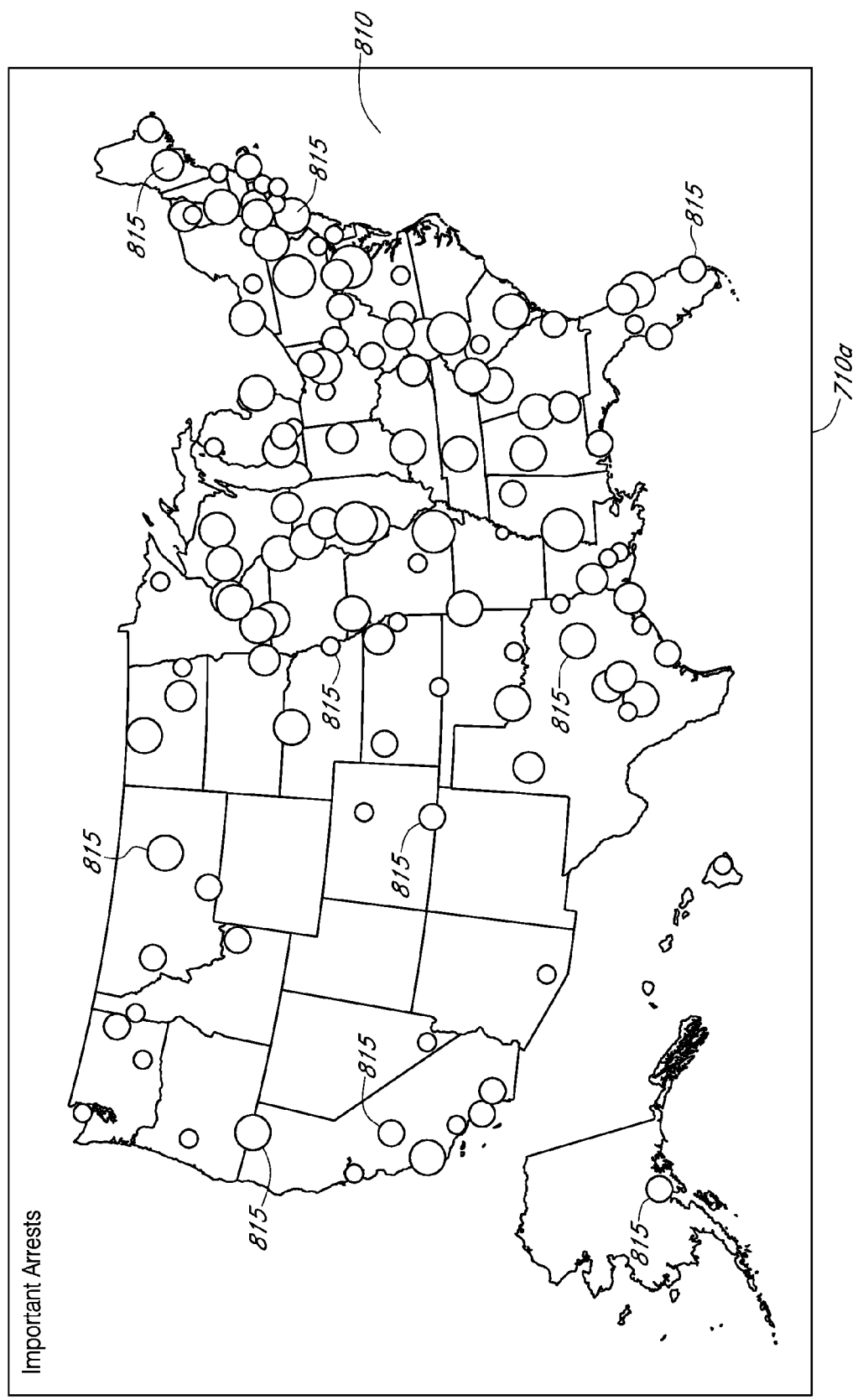

FIGS. 8A-8I are expanded view of the various panels 700 illustrated in FIG. 7, which can be included in a user interface for visualizing data of a law enforcement agency. FIG. 8A illustrates one embodiment of the panel 710a that provides a map 810 of important arrests in a geographical area (e.g., the U.S.). The map 810 may be narrowed down by a geographical region of interest. In most cases, law enforcement agencies are local to particular regions, and the default region shown in the panel 800a can be set to the particular region associated with a law enforcement agency. The circles 815 are visual indicators that represent arrests across the geographical area. The importance or priority level of the arrests may be indicated by the relative size of the circles 815. The importance of an arrest may be determined by the law enforcement agency, e.g., based on a variety of factors. For example, a law enforcement agency may assign a number or a level (e.g., high, low, etc.) indicating the importance of the arrest. Importance may be provided as a property of an arrest object or event. Also, different types of arrests may be indicated by colors or patterns of the circles 815.

The map 810 is configured to allow the user to drill down from a larger area to a smaller area. In one example, the map 810 starts with showing a country (e.g., the U.S.). The user clicks (or scrolls, presses a certain key, provides an audible command, or any other predefined input) on a state within the country, and the map 810 zooms in to show the state. The user clicks on a county in the state, and the map 810 zooms in to display the county. The user then can click on a city in the county, and the map 810 zooms in to show the details for that city, and so forth. In this way, the same panel or user interface can display information of varying levels of depth.

Figure 8B:
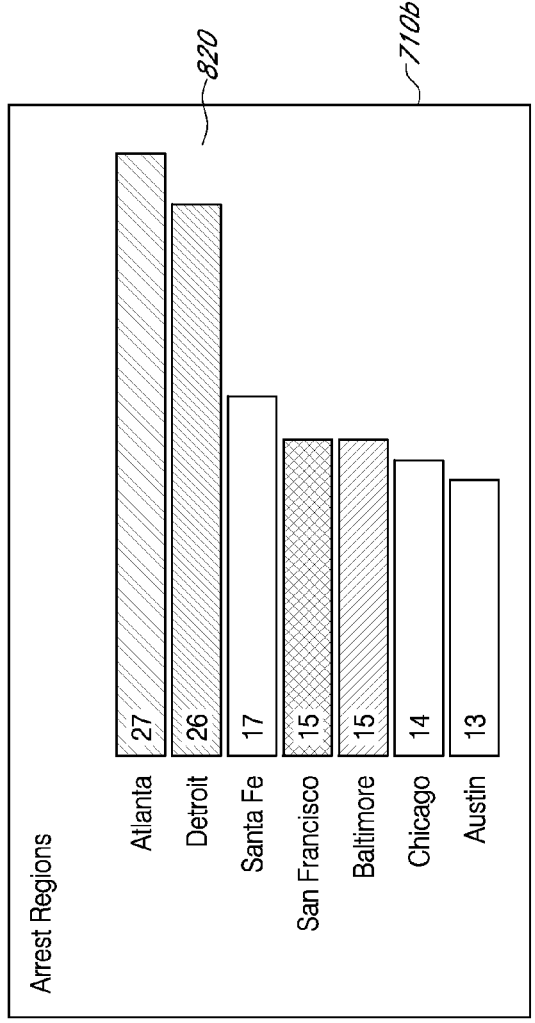

FIG. 8B illustrates one embodiment of a panel 710b that provides a bar chart 820 showing arrests by regions. The example in FIG. 8B displays the arrests for different cities. A bar can represent the number of arrests for a city or region. The number of arrests may also be displayed over the bar for the city or region. In one embodiment, clicking on a bar works as a filter, and when the user clicks on a bar for a city or region, the data in the other panels in the user interface may update to apply the filter. The bar chart 820 can display multiple series of data, for example, in the form of stacked sets of bars, which may be referred to as the stacked bar chart.

Figure 8C:
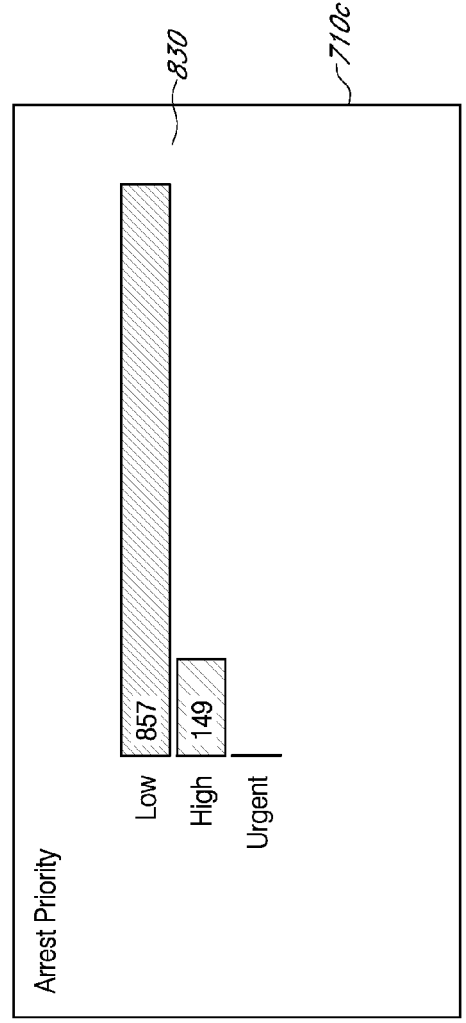

FIG. 8C illustrates one embodiment of a panel 710c that provides a bar chart 830 showing arrest priority. The example in FIG. 8C displays three different priority levels for arrests: low, high, and urgent. A bar can represent the number of arrests for a specific priority level, and the number of arrests can also be displayed over the bar for the priority level. The priority levels may be defined by a law enforcement agency as appropriate.

FIG. 8D illustrates one embodiment of a panel 710d that provides a table 840 of high priority calls for the geographical area. Similar to FIG. 4, the table 840 supports paging and can be organized as a number of pages. One page may be displayed at a time, and the different pages of the table 840 can be navigated using "prev," "next," "first," and "last" buttons. A page in the table may be scrolled within the panel 710d. The information in the table 840 can be displayed in rows and columns. The table 840 can include various types of information, depending on the preference or requirements of a law enforcement agency. The example of FIG. 8D includes date, arrest description, arrest region, arrest priority, and arrest subjects. Priority may indicate the level of crime associated with the arrest, such that more dangerous crimes may have a higher level of priority. Subjects may refer to subjects or topics relating to the arrest. The data in the table 840 can be sorted by columns (e.g., priority).

Figure 8E:
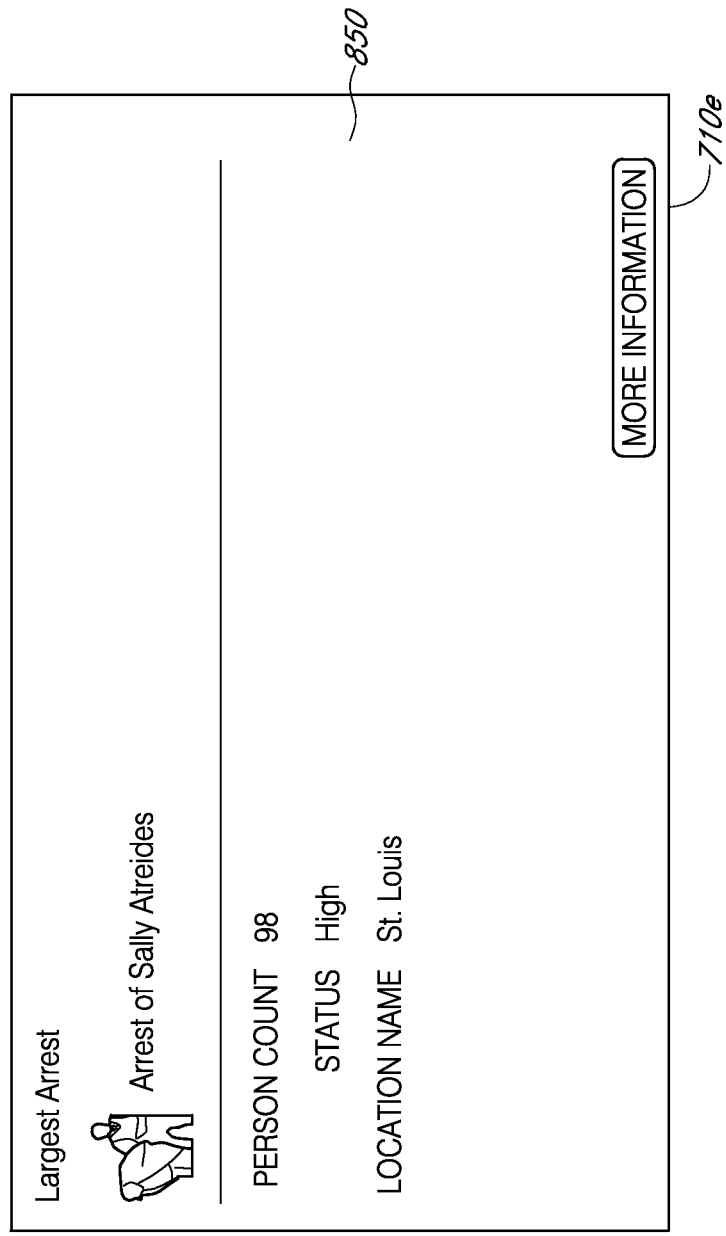

FIG. 8E illustrates one embodiment of a panel 710e that provides brief details of the largest arrest. The user interface may include a panel that provides overview information for a prominent arrest in a geographical area. In one embodiment, the largest arrest is an arrest with the largest number of individuals arrested in relation to a certain event. In the example of FIG. 8E, the information included is person count, status, and location name. Person count may refer to the number of individuals involved in the arrest. The user can view more detailed information by clicking on a link or a button. The panel may be an example of object summary visualization. For example, an arrest can be represented as an object as explained in connection with FIGS. 10-11. Information about the arrest can be represented as various properties of the object. The object summary may include some or all of the properties relating to the object. The object summary can include a link to the object itself. For example, clicking on a link or a button can bring up the screen that includes more detailed information about the object. Such screen may be referred to as the "object inspector." The object summary or the object inspector may also include links for obtaining information about the object in other applications.

Figure 8F:
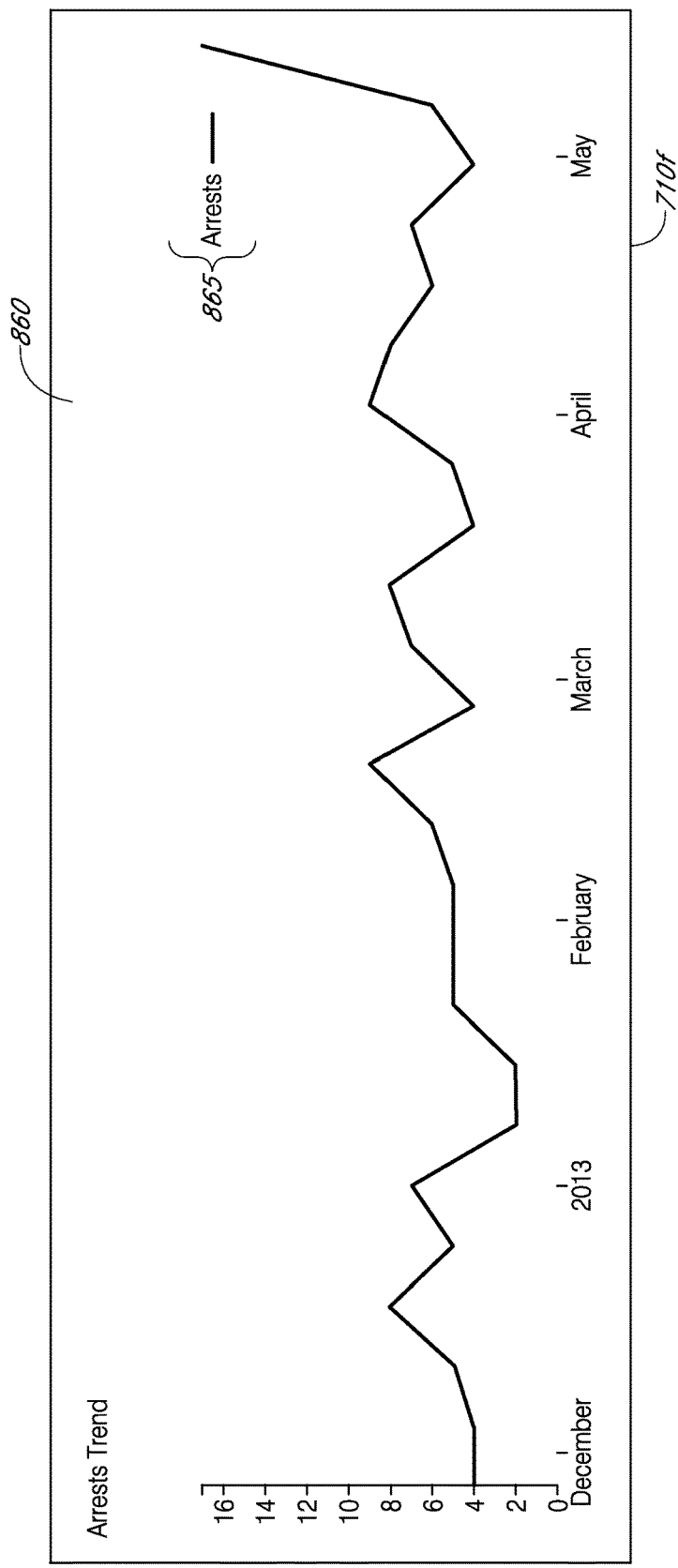

FIG. 8F illustrates one embodiment of a panel 710f that provides a time series chart 860 showing arrest trend. A time series chart can be a specific example of a line graph. A time series chart may show changes over time or time-bucketed events as a line chart. Discrete events may be represented by visual indicators (e.g., circles or bubbles). The time series chart can overlay multiple series as illustrated with respect to FIG. 8I. The time series chart 860 in FIG. 8F shows the arrest trend over several months. The months are plotted on the x-axis, and the number of arrests is plotted on the y-axis. The legend 865 provides information on the type of data that is plotted. Here, the line represents arrests. In certain embodiments, the time series chart can support selecting a time range on the time series chart itself. For example, the user can drag from left to right in order to create a time region, and the time region could be applied as a filter to the some or all of the panels 710. The time series chart may also display detailed information for a point when the mouse hovers over that point.

Figures 8G, 8H:
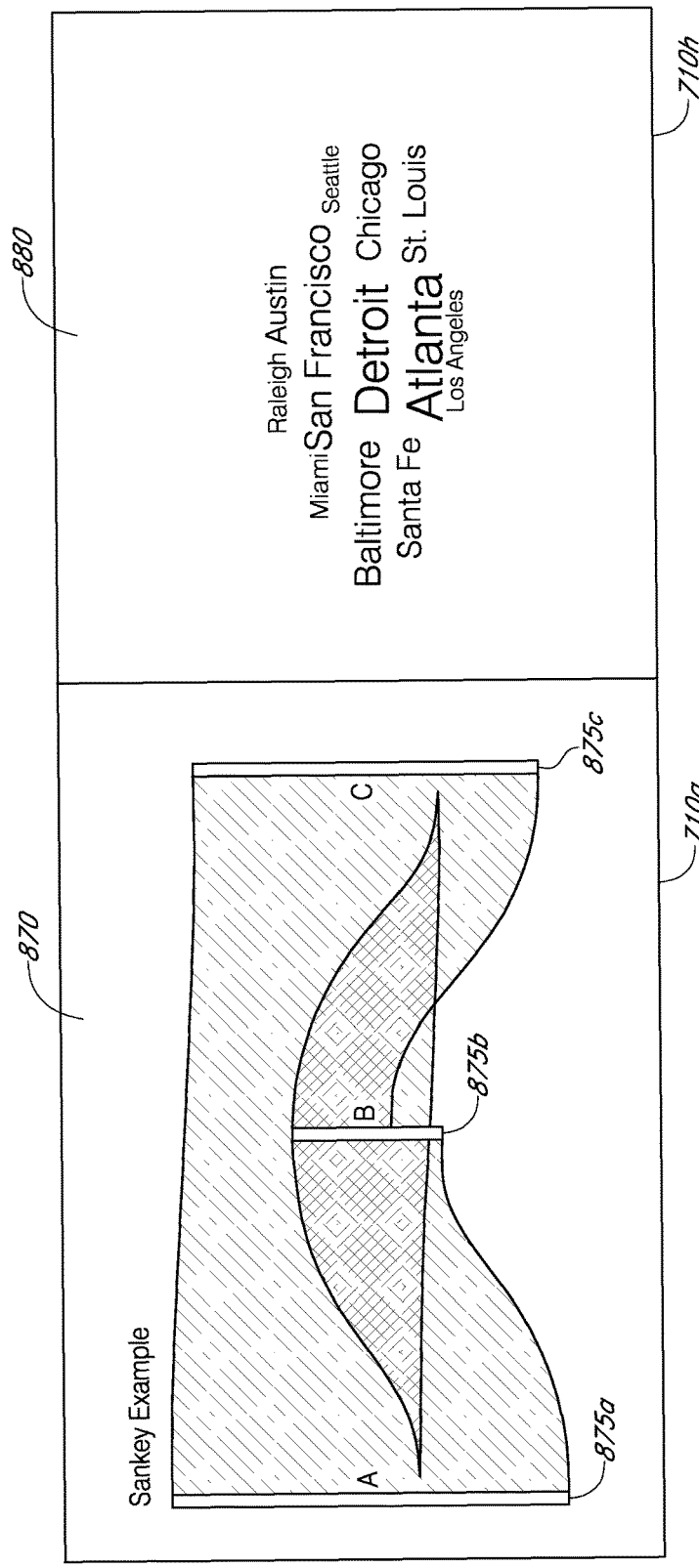

FIG. 8G illustrates one embodiment of a panel 710g that provides a sankey or flow diagram 870. A flow diagram can show how objects move between states and/or categories. The example of FIG. 8G includes three states: State A 875a; State B 875b; and State C 875c. The flow diagram 870 shows arrests moving from State A 875a to State B 875b, arrests moving from State A 875a to State C 875c, and arrests moving from State B 875b to State C 875c. In one example, State A 875a can represent arrest warrant issued, and State C 875c can represent arrest completed. State B 875b can represent an intermediate state, for example, where an attempt at arrest has been made but was unsuccessful. The width of a flow can be proportional to the quantity included in that flow. Similar to other panels, the flow diagram 870 may be updated in realtime as the user adjust one or more filters, such as to adjust a time period for which data is compiled in generating the flow diagram 870.

FIG. 8H illustrates one embodiment of a panel 710h that provides a word diagram 880. A word diagram may display various keywords according to the relative occurrence, count, or size associated with each keyword. The example of 8H displays city names in different sizes. A city that has more arrests than other cities may appear bigger in the word diagram 880; conversely, a city that has fewer arrests than other cities may appear smaller. Different colors may be used to display the keywords. The colors could represent another type of information, or simply make it easier to set the words apart from each other. The word diagram can help visualize prevalence of various words. In other embodiments, size of the keywords may be determined based on other factors, such as emergency calls, average response time to emergency calls, casualties, and/or any other attribute or combination of attributes associated with respective law enforcement agencies.

Figure 8I:
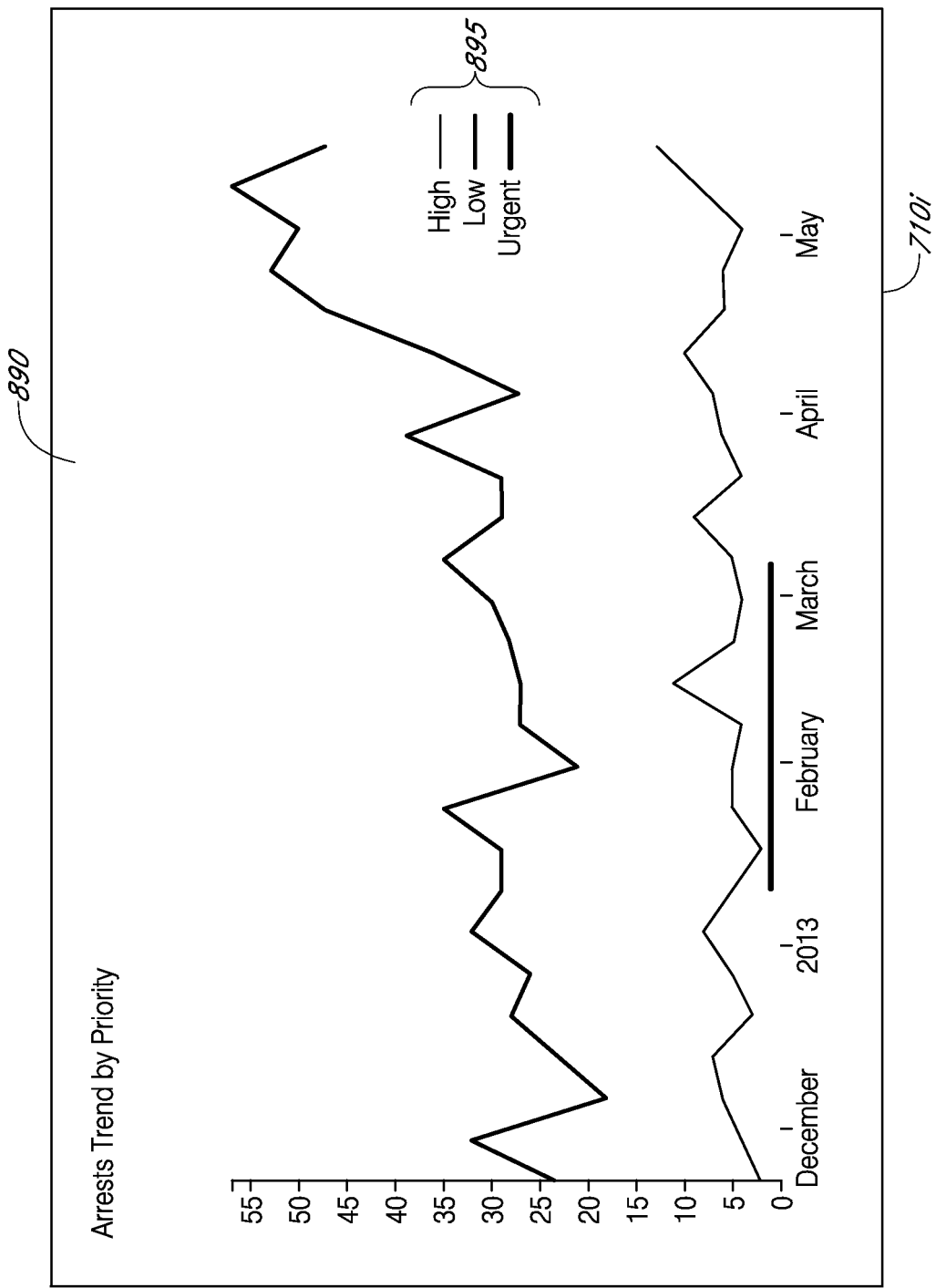

FIG. 8I illustrates one embodiment of a panel 710i that provides another time series chart 890 showing arrest trend by priority. The time series chart 890 can be similar to the time series chart 860 in FIG. 8F. The time series chart 890 also shows arrest trend, but breaks down the arrests by priority level. A separate line represents arrests at a priority level. The months are plotted on the x-axis, and the number of arrests is plotted on the y-axis. The legend 895 provides information on the type of data that is plotted. Here, the first line indicates high priority arrests; the second line indicates low priority arrests; and the third line indicates urgent arrests.

Filters can narrow or drill down the information displayed in the user interface 700,100 and/or the panels 710, 110. Filters can be temporal filters or object filters. Information displayed in the panels 710, 110 can be represented by objects, and object filters may filter data based on various properties of objects. Different types of filters may include: a keyword filter, a date filter, a time filter, a multiple value filter, etc. A keyword filter can accept one or more keywords for filtering the data. A keyword filter may support full-text searching. For example, full texts of objects can be searched. A date filter, a time filter, or a date picker may allow the user to select a specific time, date, range of time, range of date, etc. A multiple value or multi-value filter may accept more than one value for filtering the data. Users may also create their own filters (e.g., as plug-in filters). Various types of filters may be used in combination. For example, one filter is both a keyword filter and a multi-value filter; the user can enter one or more keywords in the keyword filter.

When filters are applied in the user interface 700, 100 or a panel 710, 110 in the user interface 700, 100, the user interface 700,100 or the panel 710, 110 can show an indication that the data has been filtered. For example, the user interface 700, 100 can include a button for undoing the filtering or returning to the previous unfiltered data, or the user interface 700, 100 can have a reset button to return to the initial view without any filtering. Applying a filter in one panel 710, 110 may filter the data in some or all of the other panels 710, 110. Generally, the filter will apply to the panels 710, 110 included in the user interface 700, 100. However, in some cases, application of the filter to a particular panel 710, 110 may make it more difficult for the user to navigate. For example, in FIG. 8B, the selection of a bar chart for a city or a region can work as a filter to display the data for that city or region; FIG. 8B does not filter the cities or regions initially displayed in the panel 710*b* so that the user can click on the bars for different cities or regions to view the corresponding data, but the data in the other panels 710 in the user interface are updated to reflect the filter. The panels 710, 110 and/or the user interface 700, 100 may refresh when filters are applied.

Example Method

Figure 9:
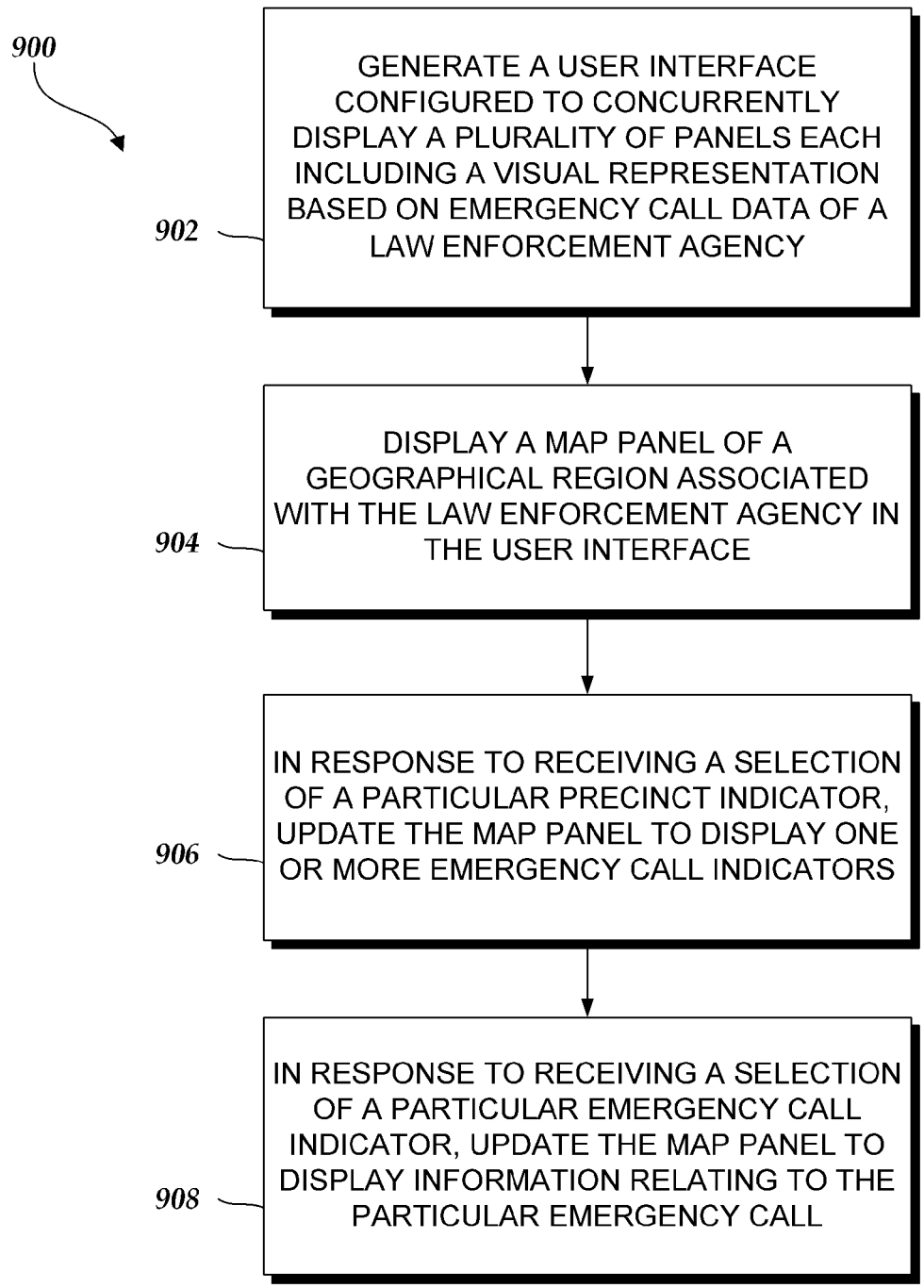
FIG. 9 illustrates a flowchart for providing a user interface including multiple panels for visualizing emergency call data of a law enforcement agency, according to certain embodiments.

FIG. 9 illustrates a flowchart for providing a user interface including multiple panels for visualizing emergency call data of a law enforcement agency, according to certain embodiments. The process 900 is explained in connection with FIGS. 1-2, but may also apply to FIGS. 7-8 or other executive dashboards. Certain details relating to the process 900 are explained in more detail with respect to FIGS. 1-8. The process 900 may be implemented by one or more systems described with respect to FIGS. 10-11, such as by a server system that has access to the various emergency call data and generates the various panels and visualizations requests by users. Depending on the embodiment, the process 900 may include fewer or additional blocks, and the blocks may be performed in an order that is different than illustrated.

At block 902, the process 900 generates a user interface 100 configured to concurrently display a plurality of panels 110 each including a visual representation based on emergency call data of a law enforcement agency. In this embodiment, the emergency call data includes data associated with a plurality of emergency calls. Types of visual representation or visualizations included in a panel 110 may include: a map, a bar chart, a table, a line graph, a time series chart, an object summary, a flow diagram, a word diagram, a pie chart, a time wheel, etc. The details relating to each type of visual representation are explained with respect to FIGS. 1-8.

At block 904, a map panel of a geographical region associated with the law enforcement agency is included in the user interface (such as the first panel 110*a* discussed above). The map of the geographical region may include a plurality of selectable precinct indicators representing a corresponding plurality of precincts for which the law enforcement agency has at least some law enforcement responsibilities. The plurality of precinct indicators may each show the number of emergency calls in a particular precinct. The precinct indicators may have different colors to convey information at a glance. For example, indicators for precincts with high number of emergency calls may be shown in orange; indicators for precincts with low number of emergency calls may be shown in green.

At block 906, in response to receiving a selection (e.g., from an executive viewing the executive dashboard) of a particular precinct indicator corresponding to a particular precinct, the map panel is updated to display one or more emergency call indicators representing a corresponding one or more emergency calls within the selected precinct. Emergency calls may be represented as objects and have properties associated with them, such as job ID, time and date, location, radio code, assigned resource, comments, etc. The one or more emergency call indicators can have different colors and/or shapes to convey information quickly. For example, different colors correspond to different types of jobs or radio codes, and different shapes indicate how recent the emergency calls are.

At block 908, in response to receiving a selection of a particular emergency call indicator corresponding to a particular emergency call, the map panel is updated to display information relating to the particular emergency call. Information about the emergency call may be displayed on the map itself or in a separate pop-up window. In one example, brief information is shown on the map itself, next to the emergency call indicator, and detailed information is displayed in the separate pop-up window. The details may include job number, time and date, location, comments, etc.

In certain embodiments, a second panel displaying a statistic relating to at least some of the emergency call data is included in the user interface. In one embodiment, the statistic in the second panel is associated with the one or more emergency calls within the particular precinct. In another embodiment, the statistic in the second panel is associated with emergency calls in all of the plurality of precincts in the geographical region.

In some embodiments, a filter may be applied to the map panel. Applying the filter may update the map panel to display the one or more emergency call indicators that meet criteria indicated by the filter. Types of filters can include: a keyword filter, a date filter, a time filter, a multiple value filter, etc. The filter applied in the map panel can also be applied in the second panel and/or another panel of the plurality of panels.

The type of information displayed in the panels may include: high priority emergency calls, historical trend of emergency calls, top radio codes, top radio subcodes, etc. For example, the plurality of panels other than the map panel can display any of the different types of information listed above.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Object Centric Data Model

To provide a framework for the following discussion of specific systems and methods described herein, an example database system 1210 using an ontology 1205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

FIG. 10 illustrates an object-centric conceptual data model according to an embodiment. An ontology 1205, as noted above, may include stored information providing a data model for storage of data in the database 1209. The ontology 1205 may be defined by one or more object types, which may each be associated with one or more property types. At the highest level of abstraction, data object 1201 is a container for information representing things in the world. For example, data object 1201 can represent an entity such as a person, a place, an organization, a market instrument, or other noun. Data object 1201 can represent an event that happens at a point in time or for a duration. Data object 1201 can represent a document or other unstructured data source such as an e-mail message, a news report, or a written paper or article. Each data object 1201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 1210 may have a property type defined by the ontology 1205 used by the database 1205.

Objects may be instantiated in the database 1209 in accordance with the corresponding object definition for the particular object in the ontology 1205. For example, a specific monetary payment (e.g., an object of type "event") of US$30.00 (e.g., a property of type "currency") taking place on Mar. 27, 2009 (e.g., a property of type "date") may be stored in the database 1209 as an event object with associated currency and date properties as defined within the ontology 1205.

The data objects defined in the ontology 1205 may support property multiplicity. In particular, a data object 1201 may be allowed to have more than one property 203 of the same property type. For example, a "Person" data object might have multiple "Address" properties or multiple "Name" properties.

Each link 1202 represents a connection between two data objects 1201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1201 can have multiple links with another data object 1201 to form a link set 1204. For example, two "Person" data objects representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 11 is a block diagram that illustrates a computer system 1800 upon which an embodiment may be implemented. For example, the computing system 1800 may comprises a server system that accesses law enforcement data and provides user interface data to one or more users (e.g., executives) that allows those users to view their desired executive dashboards and interface with the data. Other computing systems discussed herein, such as the user (e.g., executive), may include any portion of the circuitry and/or functionality discussed with reference to system 1800.

Computer system 1800 includes a bus 1802 or other communication mechanism for communicating information, and a hardware processor, or multiple processors, 1804 coupled with bus 1802 for processing information. Hardware processor(s) 1804 may be, for example, one or more general purpose microprocessors.

Computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

Computer system 1800 further includes a read only memory (ROM) 808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

Computer system 1800 may be coupled via bus 1802 to a display 1812, such as a cathode ray tube (CRT) or LCD display (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1810. Volatile media includes dynamic memory, such as main memory 1806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN (or WAN component to communicated with a WAN). Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to provide a customizable user interface relating to visualization of data associated with a law enforcement agency, the computer system comprising:
    one or more hardware computer processors configured to execute code in order to cause the system to:
        generate a user interface configured to concurrently display a plurality of panels each including a visual representation based on data of a law enforcement agency, the data comprising data associated with a plurality of events,
    wherein the plurality of panels comprises at least:
        a first panel displaying a selectable list of precincts and a map of a geographical region associated with the law enforcement agency, the map of the geographical region comprising a plurality of selectable indicators representing a corresponding plurality of events, the first panel configured to:
            in response to receiving a selection of a particular indicator, update the map displayed in the first panel to display, overlaid on the map, one or more detail information items related to the particular indicator; and
            in response to receiving a selection of a particular precinct from the selectable list of precincts, update the first panel to show events associated with the particular precinct and not events associated with other precincts;
        a second panel displaying a list of the events corresponding to at least some of the plurality of events displayed in the first panel, the second panel configured to dynamically update the list in response to the selection of the particular precinct from the selectable list of precincts in the first panel to show events associated with the particular precinct and not events associated with other precincts; and
        a third panel displaying data of the law enforcement agency related to events, wherein the third panel is configured not to update in response to the selection of the particular precinct in the first panel.

2. The system of claim 1, wherein the list in the second panel is further dynamically updated to show events associated with the geographical region.

3. The system of claim 1, wherein the plurality of panels further comprise a visual representation including at least one of: a map, a bar chart, a table, a line graph, a time series chart, an object summary, a flow diagram, a word diagram, a pie chart, or a time wheel.

4. The system of claim 1, wherein the plurality of events include at least one of: high priority emergency calls, historical trend of emergency calls, top radio codes, or top radio subcodes.

5. The system of claim 1, wherein the code is further configured to cause the system to apply a filter to the first panel, wherein applying the filter updates the first panel to display the one or more detail information items that meet criteria indicated by the filter.

6. The system of claim 5, wherein the filter comprises at least one of: a keyword filter, a date filter, a time filter, or a multiple value filter.

7. The system of claim 5, wherein applying the filter to the first panel applies the filter to one or more other panels of the plurality of panels.

8. The system of claim 1, wherein each panel in the plurality of panels is resizable.

9. The system of claim 1, wherein settings for each panel in the plurality of panels are customized for an individual user, a group of users, or an organization.

10. The system of claim 1, wherein the one or more detail information items are displayed in a pop-up overlaid on the map.

11. A method of providing a customizable user interface relating to visualization of data associated with a law enforcement agency, the method comprising:
    generating, using one or more hardware computer processors, a user interface configured to concurrently display a plurality of panels each including a visual representation based on data of a law enforcement agency, the data comprising data associated with a plurality of events;
    displaying in the user interface at least a first panel of the plurality of panels, the first panel displaying a selectable list of precincts and a map of a geographical region associated with the law enforcement agency, the map of the geographical region comprising a plurality of selectable indicators representing a corresponding plurality of events;
    in response to receiving a selection of a particular indicator, updating the map displayed in the first panel to display, overlaid on the map, one or more detail information items related to the particular indicator;
    in response to receiving a selection of a particular precinct from the selectable list of precincts, updating the first panel to show events associated with the particular precinct and not events associated with other precincts;
    displaying in the user interface a second panel of the plurality of panels, the second panel configured to display a list of the events corresponding to at least some of the plurality of events displayed in the first panel, and dynamically update the list in response to the selection of the particular precinct from the selectable list of precincts in the first panel to show events associated with the particular precinct and not events associated with other precincts; and displaying in the user interface a third panel of the plurality of panels, the third panel configured to display data of the law enforcement agency related to events, wherein the third panel is configured not to update in response to the selection of the particular precinct in the first panel.

12. The method of claim 11, wherein the plurality of panels further comprise a visual representation including at least one of: a map, a bar chart, a table, a line graph, a time series chart, an object summary, a flow diagram, a word diagram, a pie chart, or a time wheel.

13. The method of claim 11, further comprising applying a filter to the second panel, wherein applying the filter updates the second panel to display the list of events including events that meet criteria indicated by the filter.

14. The method of claim 11, wherein the plurality of events include at least one of: high priority emergency calls, historical trend of emergency calls, top radio codes, or top radio subcodes.

15. The method of claim 11, further comprising applying a filter to the first panel, wherein applying the filter updates the first panel to display the one or more detail information items that meet criteria indicated by the filter.

16. The method of claim 15, wherein the filter comprises at least one of: a keyword filter, a date filter, a time filter, or a multiple value filter.

17. The method of claim 15, wherein applying the filter to the first panel applies the filter to one or more other panels of the plurality of panels.

18. The method of claim 11, wherein the one or more detail information items are displayed in a pop-up overlaid on the map.

19. A non-transitory computer readable medium comprising instructions for providing a customizable user interface relating to visualization of data associated with a law enforcement agency that cause a hardware computer processor to:

generate a user interface configured to concurrently display a plurality of panels each including a visual representation based on data of a law enforcement agency, the data comprising data associated with a plurality of events;

display in the user interface at least a first panel of the plurality of panels, the first panel displaying a selectable list of precincts and a map of a geographical region associated with the law enforcement agency, the map of the geographical region comprising a plurality of selectable indicators representing a corresponding plurality of events;

in response to receiving a selection of a particular indicator, update the map displayed in the first panel to display, overlaid on the map, one or more detail information items related to the particular indicator;

in response to receiving a selection of a particular precinct from the selectable list of precincts, update the first panel to show events associated with the particular precinct and not events associated with other precincts;

display in the user interface a second panel of the plurality of panels, the second panel displaying a list of the events corresponding to at least some of the plurality of events displayed in the first panel;

dynamically update the list in the second panel in response to the selection of the particular precinct from the selectable list of precincts in the first panel to show events associated with the particular precinct and not events associated with other precincts; and display in the user interface a third panel of the plurality of panels, the third panel displaying data of the law enforcement agency related to events, wherein the third panel is configured not to update in response to the selection of the particular precinct in the first panel.

* * * * *